(12) United States Patent
Yeon

(10) Patent No.: US 10,907,775 B2
(45) Date of Patent: Feb. 2, 2021

(54) OPTICAL LENS, LIGHTING MODULE AND LIGHT UNIT HAVING THE SAME

(71) Applicant: LG INNOTEK CO., LTD., Seoul (KR)

(72) Inventor: Je Dong Yeon, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/628,466

(22) PCT Filed: Jul. 11, 2018

(86) PCT No.: PCT/KR2018/007838
§ 371 (c)(1),
(2) Date: Jan. 3, 2020

(87) PCT Pub. No.: WO2019/027154
PCT Pub. Date: Feb. 7, 2019

(65) Prior Publication Data
US 2020/0217463 A1 Jul. 9, 2020

(30) Foreign Application Priority Data

Jul. 12, 2017 (KR) .......................... 10-2017-0088366

(51) Int. Cl.
*F21K 9/69* (2016.01)
*F21V 5/04* (2006.01)
(Continued)

(52) U.S. Cl.
CPC .................. *F21K 9/69* (2016.08); *F21V 5/04* (2013.01); *F21V 17/101* (2013.01); *G02B 5/003* (2013.01); *F21Y 2115/10* (2016.08)

(58) Field of Classification Search
CPC . F21K 9/69; F21V 5/04; F21V 17/101; G02B 5/003
See application file for complete search history.

(56) References Cited

U.S. PATENT DOCUMENTS 9,683,715 B2 * 6/2017 Min .................... G02B 19/0071
10,139,077 B2 * 11/2018 Kang .................. G02B 19/0014
(Continued)

FOREIGN PATENT DOCUMENTS

| JP | 2016127030 A | * 7/2016 | ............. G02B 7/022 |
| KR | 10-2014-0145404 A | 12/2014 | |

(Continued)

*Primary Examiner* — William N Harris
(74) *Attorney, Agent, or Firm* — Birch, Stewart, Kolasch & Birch, LLP

(57) ABSTRACT

A lighting module includes: a circuit board having a plurality of first recesses; an optical lens disposed on the circuit board and including a plurality of protrusion portions; a light emitting device disposed between the optical lens and the circuit board; and an absorbing layer disposed on the circuit board. The optical lens includes: a bottom surface, a second recess having an incident surface concave at a center region of the bottom surface, and a first exit surface. Each of the protrusion portions protrudes from the bottom surface toward the circuit board. The second recess is disposed on the light emitting device, and a portion of each of the protrusion portions is disposed in each of the first recesses. The absorbing layer surrounds at least one of the protrusion portions on the circuit board.

20 Claims, 16 Drawing Sheets

(51) Int. Cl.
*F21V 17/10* (2006.01)
*G02B 5/00* (2006.01)
*F21Y 115/10* (2016.01)

(56) References Cited

U.S. PATENT DOCUMENTS

| | | | | |
|---|---|---|---|---|
| 2006/0098308 A1* | 5/2006 | Angelini | ............... | F21V 7/0091 |
| | | | | 359/820 |
| 2010/0195335 A1 | 8/2010 | Allen et al. | | |
| 2010/0302785 A1 | 12/2010 | Zhou | | |
| 2012/0206673 A1* | 8/2012 | Ogata | ............... | G02F 1/133603 |
| | | | | 349/69 |
| 2013/0188100 A1* | 7/2013 | Ikuta | ......................... | F21V 7/04 |
| | | | | 348/739 |
| 2013/0229810 A1* | 9/2013 | Pelka | ................ | G02B 19/0028 |
| | | | | 362/311.02 |
| 2015/0219966 A1* | 8/2015 | Song | ........................ | F21V 7/04 |
| | | | | 362/97.3 |
| 2016/0201875 A1 | 7/2016 | Kang et al. | | |
| 2018/0347786 A1* | 12/2018 | Feng | ........................ | F21V 13/04 |
| 2019/0063695 A1* | 2/2019 | Oh | ............................ | F21V 5/10 |

FOREIGN PATENT DOCUMENTS

| | | |
|---|---|---|
| KR | 10-2015-0049669 A | 5/2015 |
| KR | 10-2016-0138680 A | 12/2015 |

\* cited by examiner

OPTICAL LENS, LIGHTING MODULE AND LIGHT UNIT HAVING THE SAME

CROSS REFERENCE TO RELATED APPLICATIONS

This application is the National Phase of PCT International Application No. PCT/KR2018/007838, filed on Jul. 11, 2018, which claims priority under 35 U.S.C. 119(a) to Patent Application No. 10-2017-0088366, filed in the Republic of Korea on Jul. 12, 2017, all of which are hereby expressly incorporated by reference into the present application.

TECHNICAL FIELD

The present invention relates to an optical lens, a lighting module and a light unit having the same.

BACKGROUND ART

Light emitting devices, e.g. light emitting diodes, are one type of semiconductor devices that convert electrical energy into light, and are gaining much attention as a next generation light source as substitutes for existing fluorescent lamps, incandescent lamps, etc.

Since the light emitting diodes generate light using semiconductor devices, the light emitting diodes consume very low electricity compared to incandescent lamps that heat tungsten to generate light, or fluorescent lamps that collide ultraviolet rays generated through high voltage discharge with a fluorescent material to generate light.

In addition, since the light emitting diodes generate light using potential gaps of the semiconductor devices, the light emitting diodes have long lives, rapid response characteristics, and eco-friendly characteristics compared to existing light sources.

Consequently, many studies for substituting existing light sources with the light emitting diodes are being carried out, and the use of the light emitting diodes as light sources of various lighting devices used indoors and outdoors such as lamps, display devices, electronic display boards, street lamps, etc. is increasing.

DISCLOSURE

Technical Problem

An embodiment of the invention provides a lighting module in which a layer is arranged to absorb some light traveling to a bottom surface of an optical lens on a circuit board.

An embodiment of the invention provides a lighting module in which a layer for absorbing light is disposed on a region of brightness portion of light traveling to a bottom surface of an optical lens on a circuit board.

An embodiment of the invention provides a lighting module which has a protrusion portion supporting an optical lens and an absorbing layer around the protrusion portion, to absorb light on a region of a brightness portion.

An embodiment of the invention provides a lighting module capable of lowering the central luminance by dispersing an absorbing layer on a region of a brightness portion for light reflected from an optical lens and traveling to a circuit board.

An embodiment of the invention provides an optical lens that changes an exit angle of light incident from a light emitting device emitting at least five sides, and a lighting module having the same.

An embodiment of the invention provides an optical lens that an emission angle of the light emitted to the region outside an angle of beam spread of the light is smaller than the incident angle, and a lighting module having the same.

Technical Solution

A lighting module according to an embodiment of the invention comprises: a circuit board having a plurality of first recesses; an optical lens disposed on the circuit board; a light emitting device disposed between the optical lens and the circuit board; and an absorbing layer disposed on the circuit board, the optical lens comprises: a bottom surface; a first exit surface having a convex curved surface, a second recess having an incident surface concave from the bottom surface toward the first exit surface; and a plurality of protrusion portions protruding from the bottom surface toward the circuit board, wherein the second recess is disposed on the light emitting device, a part of each of the plurality of protrusion portions is disposed in the first recess, wherein the absorbing layer surrounds at least one of the plurality of protrusion portions on the circuit board and the absorbing layer surrounding the protrusion portions is disposed in a region of 2.5 times or less a radius of the protrusion portions from a center of the protrusion portions, wherein the center of the protrusion portions is disposed in a range of 0.3 to 0.95 of a radius of a bottom surface from a bottom center of the second recess.

According to an embodiment of the invention, the absorbing layer includes a plurality of absorbing layers, and the plurality of absorbing layers are disposed around each of the protrusion portions, and may include an adhesive member between the first recess and the protrusion portions.

According to the embodiment of the invention, the absorbing layer may be disposed in a range of 1.3 to 2.5 times a radius of the protrusion portion from a center of the protrusion portion.

According to an embodiment of the invention, the light module has a center of the protrusion portion which may be positioned in a range of 45 degrees to 85 degrees at an angle with the bottom center of the bottom surface based on the first exit surface.

According to an embodiment of the invention, the center of the protrusion portion may be positioned in a range of 45 to 85 degrees at an angle with the center of the light emitting device based on the first exit surface.

According to an embodiment of the invention, an area of a top surface of the absorbing layer surrounding the protrusion portions may be smaller than the bottom area of the protrusion portions.

According to an embodiment of the invention, the top surface area of the absorbing layer surrounding the protrusion portions may be greater than the bottom area of the protrusion portions and less than 2.6 times.

According to an embodiment of the invention, the top surface area of the absorbing layer facing the bottom surface of the optical lens may be arranged to be 11% or less of bottom surface area of the lens.

According to an embodiment of the invention, the absorbing layer may be disposed in a ring shape around each of the plurality of protrusion portions.

According to an embodiment of the invention, the adhesive member may be disposed between the absorbing layer and the protrusion portion.

According to an embodiment of the invention, the absorbing layer may include a plurality of absorbing regions along a periphery of the protrusion portions and a space between the plurality of absorbing regions.

According to an embodiment of the invention, the protrusion portion and the absorbing layer are disposed on a region of brightness portion where light emitted from the light emitting device is reflected and transmitted by the first exit surface, and the region of brightness portion may include a region which the light intensity of the light traveling to the bottom surface is 80% or more of a peak value among the bottom surface of the optical lens.

According to an embodiment of the invention, the optical lens are arranged in plural in a first direction on the circuit board, a length of the optical lens in the second direction is longer than a length of the circuit board in the second direction, wherein the lengths of the optical lens in the first and second directions may be greater than a thickness of the optical lens.

A lighting module according to an embodiment of the invention comprises: a plurality of first recesses on a circuit board; a light emitting device disposed on the circuit board; an optical lens having a plurality of protrusion portions and disposed on the light emitting device; and an adhesive member for adhering the protrusion portion to the first recess, wherein the circuit board includes an absorbing layer disposed around each of the plurality of first recesses, wherein the optical lens includes a bottom surface, a concave second recess in a center region of the bottom surface, an incident surface around the second recess, and a first exit surface having a convex curved surface on an upper portion, wherein the protrusion portion protrudes from the bottom surface toward the circuit board, wherein the protrusion portion is closer to an outer second edge portion than an inner first edge portion of the bottom surface, and the protrusion portion and the absorbing layer may disposed on a region of brightness portion where light emitted from the light emitting device is reflected by the first exit surface and is collected.

According to the embodiment of the invention, the adhesive member is disposed between the protrusion portion and the absorbing layer, and the adhesive member may be disposed between the bottom surface of the optical lens and the top surface of the circuit board.

According to an embodiment of the invention, the absorbing layer extends into a region between the adhesive member and the circuit board, and the adhesive member may be disposed between the absorbing layer and the bottom surface of the optical lens.

According to an embodiment of the invention, one or a plurality of regions of the absorbing layer may have a ring shape.

According to an embodiment of the invention, the absorbing layer may include a plurality of absorbing regions disposed along a periphery of the protrusion portions and a space between the plurality of absorbing regions.

According to an embodiment of the invention, the plurality of absorbing regions may have a length of the same circular arc from each other, or at least two of the absorbing regions may have a length of different circular arcs.

According to an embodiment of the invention, an area of the top surface of the absorbing layer may be larger than the area of the space.

According to an embodiment of the invention, the region of brightness portion may include a region which the light intensity of the light traveling to the bottom surface is 80% or more of a peak value among the bottom surface of the optical lens.

According to an embodiment of the invention, the optical lens are arranged in plural in the first direction on the circuit board, and the length of the optical lens in the second direction is longer than the length of the circuit board in the second direction, wherein the length of the optical lens in the first and second directions may be greater than the thickness of the optical lens.

The light unit of the embodiment may include an optical sheet on the lighting module.

Advantageous Effects

Embodiments of the invention may absorb light reflected from the region of brightness portion located at the bottom of the optical lens, thereby improving the luminance distribution of the optical lens.

Embodiments of the invention may lower the luminance brightness of the center region of the optical lens by the absorbing layer of the circuit board disposed on the region of brightness portion of the optical lens.

The embodiment of the invention may improve the FWHM (full width at half maximum) of the light emitted to the optical lens by the absorbing layer of the circuit board disposed on the region of brightness portion of the optical lens.

Embodiments of the invention may reduce noise such as hot spot caused by light extracted from an optical lens.

Embodiments of the invention may reduce optical interference between adjacent optical lenses.

Embodiments of the invention may improve the image by minimizing interference between adjacent optical lenses.

Embodiments of the invention may reduce interference between optical lenses on different circuit boards.

Embodiments of the invention may provide a wide gap between light emitting devices by an optical lens, thereby reducing interference between optical lenses.

Embodiments of the invention may reduce the number of light emitting devices disposed in a light unit.

Embodiments of the invention may improve the reliability of a lighting module having an optical lens.

Embodiments of the invention may improve the reliability of a light unit having an optical lens.

Embodiments of the invention may improve the reliability of an illumination system having a lighting module.

BEST MODE

Hereinafter, embodiments will become apparent by the accompanying drawings and description of the embodiments. In the description of the embodiments, when it is described that each layer (film), region, pattern, or structure is formed "above/on" or "below/under" a substrate, each layer (film), region, pad or pattern, includes being formed both "directly" or "indirectly (by interposing another layer)" "above/on" and "below/under". Also, a standard of above/on or below/under of each layer will be described with respect to the drawings. In the description of the embodiments, like reference numbers represent like elements through description of the drawings.

Hereinafter, an optical lens, a circuit board, and a lighting module including the same will be described with reference to the accompanying drawings.

Figure 1:
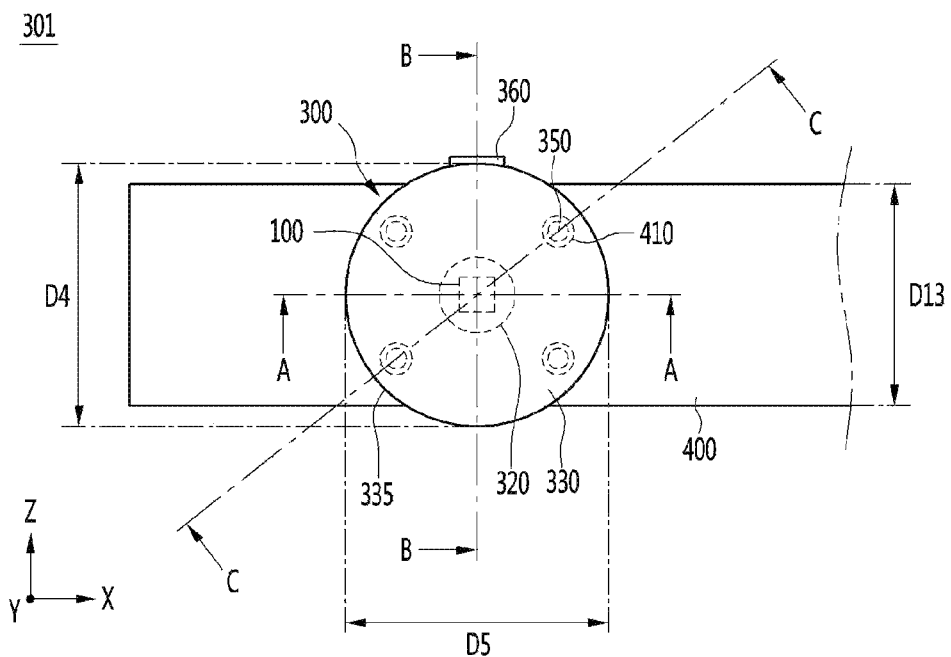
FIG. 1 is a plan view of a lighting module according to an embodiment of the invention.
Figure 2:
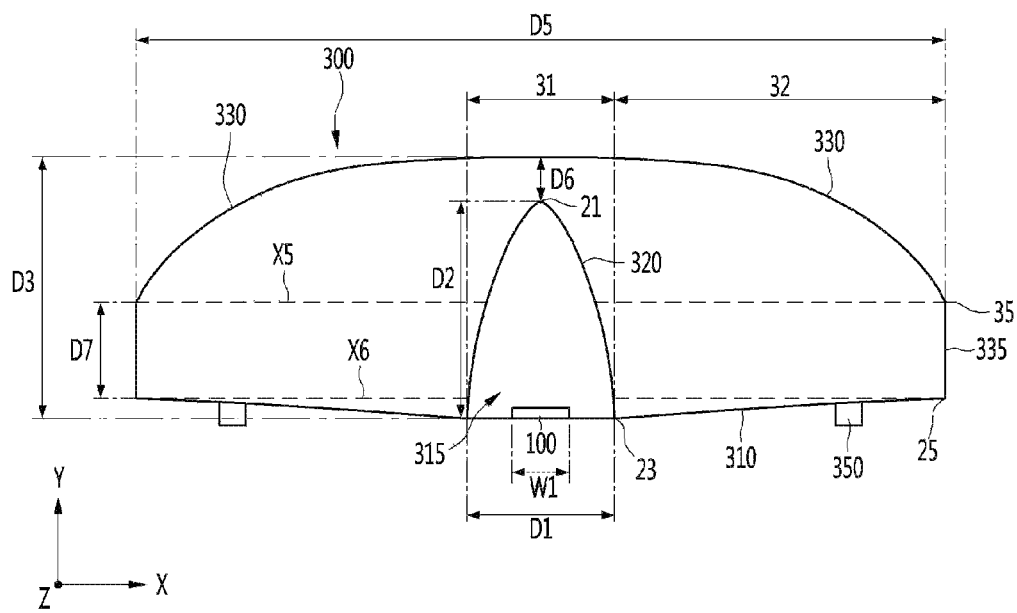
FIG. 2 is a side cross-sectional view of the optical lens of FIG. 1.
Figure 3:
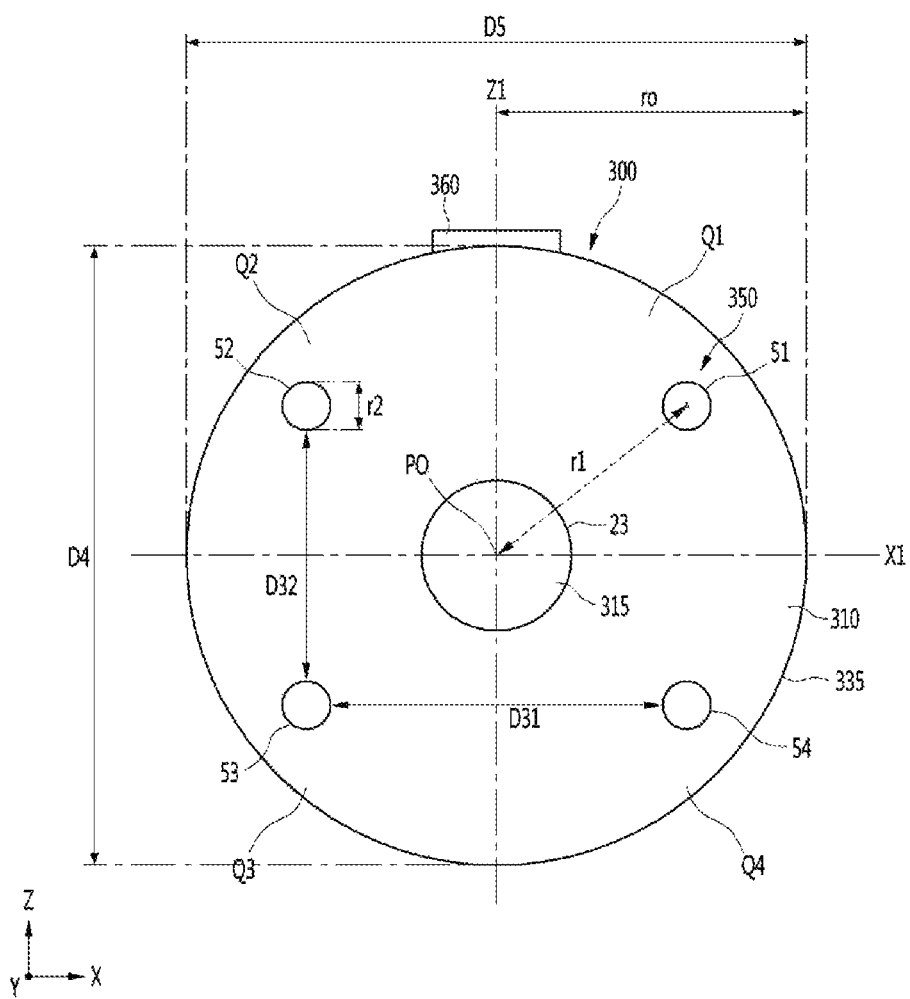
FIG. 3 is a bottom view of the optical lens of FIG. 1.
Figure 4:
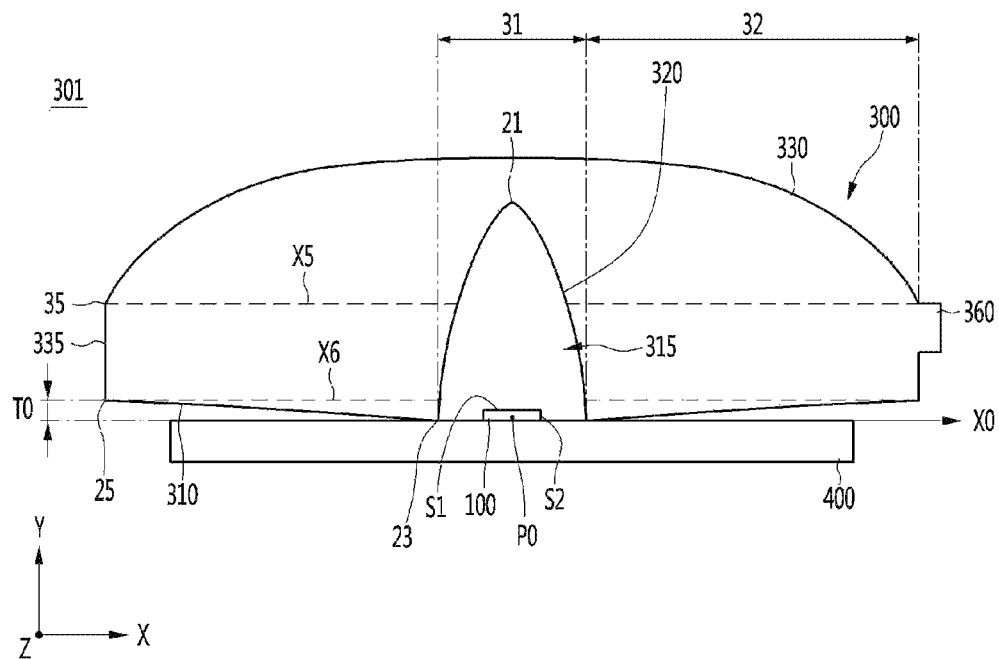
FIG. 4 is a cross-sectional view taken along line B-B of the lighting module of FIG. 1.
Figure 5:
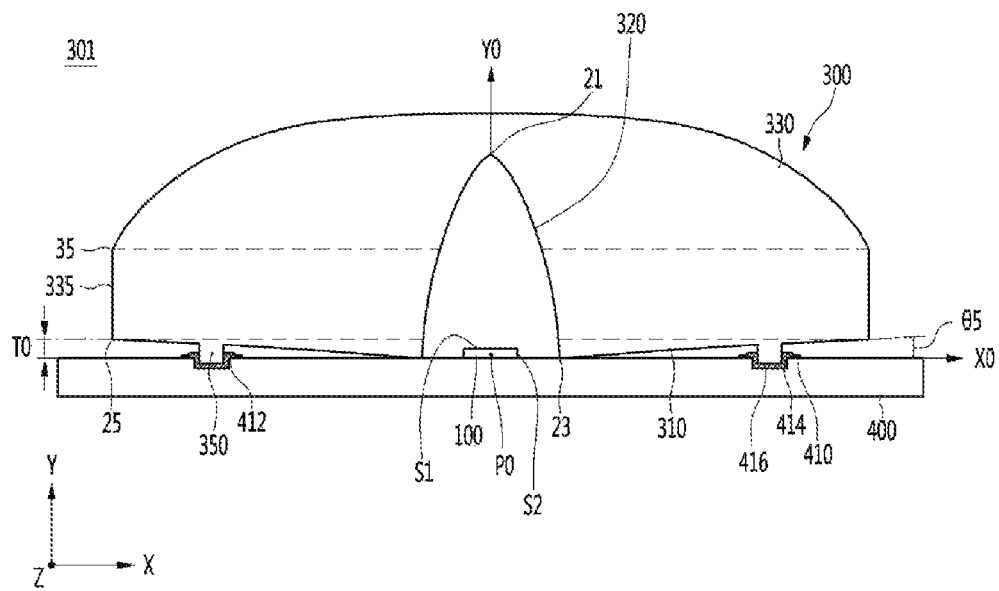
FIG. 5 is a cross-sectional view taken along line C-C of the lighting module of FIG. 1.
Figure 6:
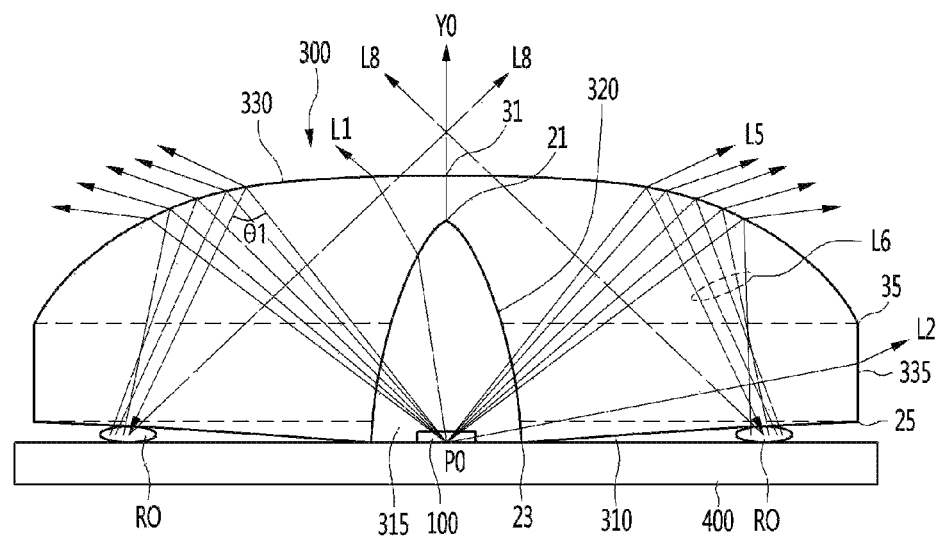
FIG. 6 is a cross-sectional view taken along line A-A of FIG. 1, and is a view for illustrating the path of light.
Figure 7:
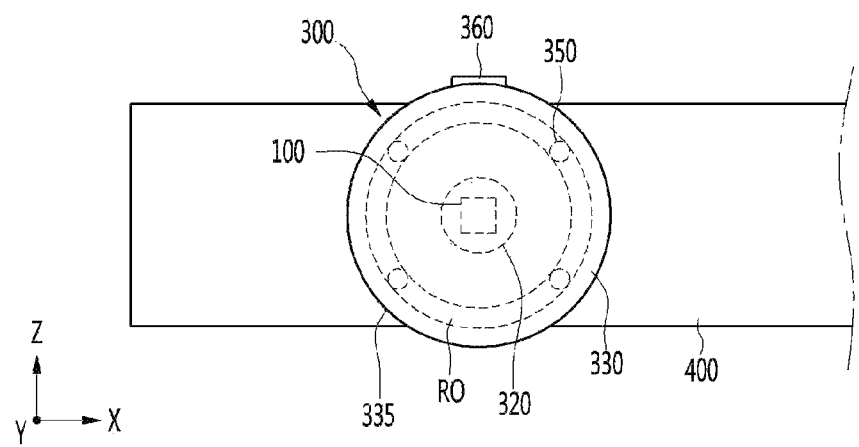
FIG. 7 is a plan view showing a region of brightness portion according to the optical path of FIG. 6.
Figure 8:
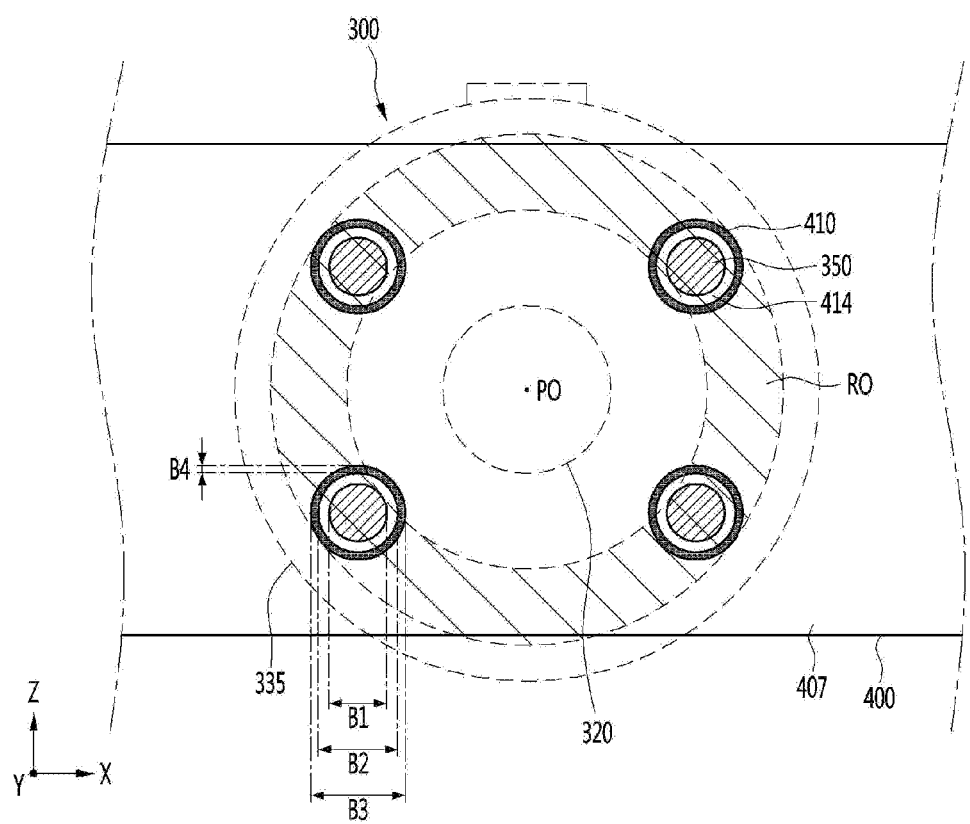
FIG. 8 is a perspective view of an optical lens of a lighting module according to an embodiment of the invention, and is a plan view showing an absorbing layer on a circuit board and protrusion portions of an optical lens.
Figure 9:
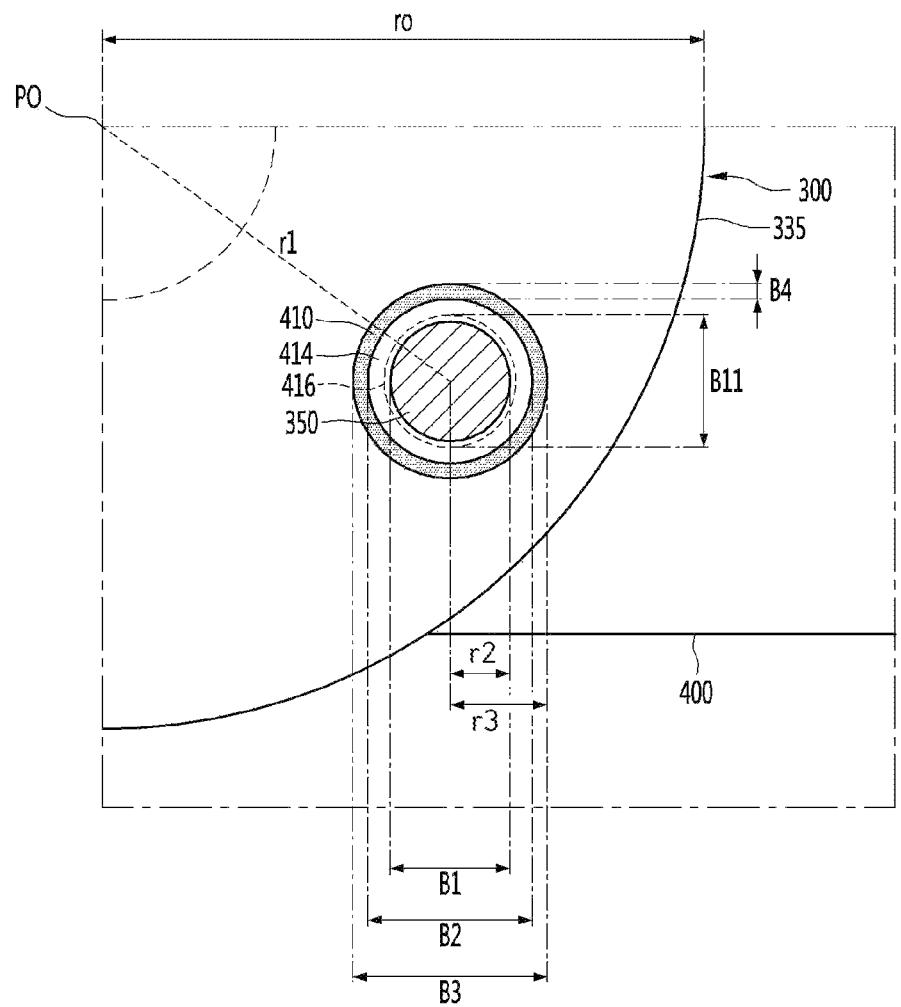
FIG. 9 is an enlarged view of the absorbing layer of the circuit board and the protrusion portion of the optical lens in FIG. 8.
Figure 10:
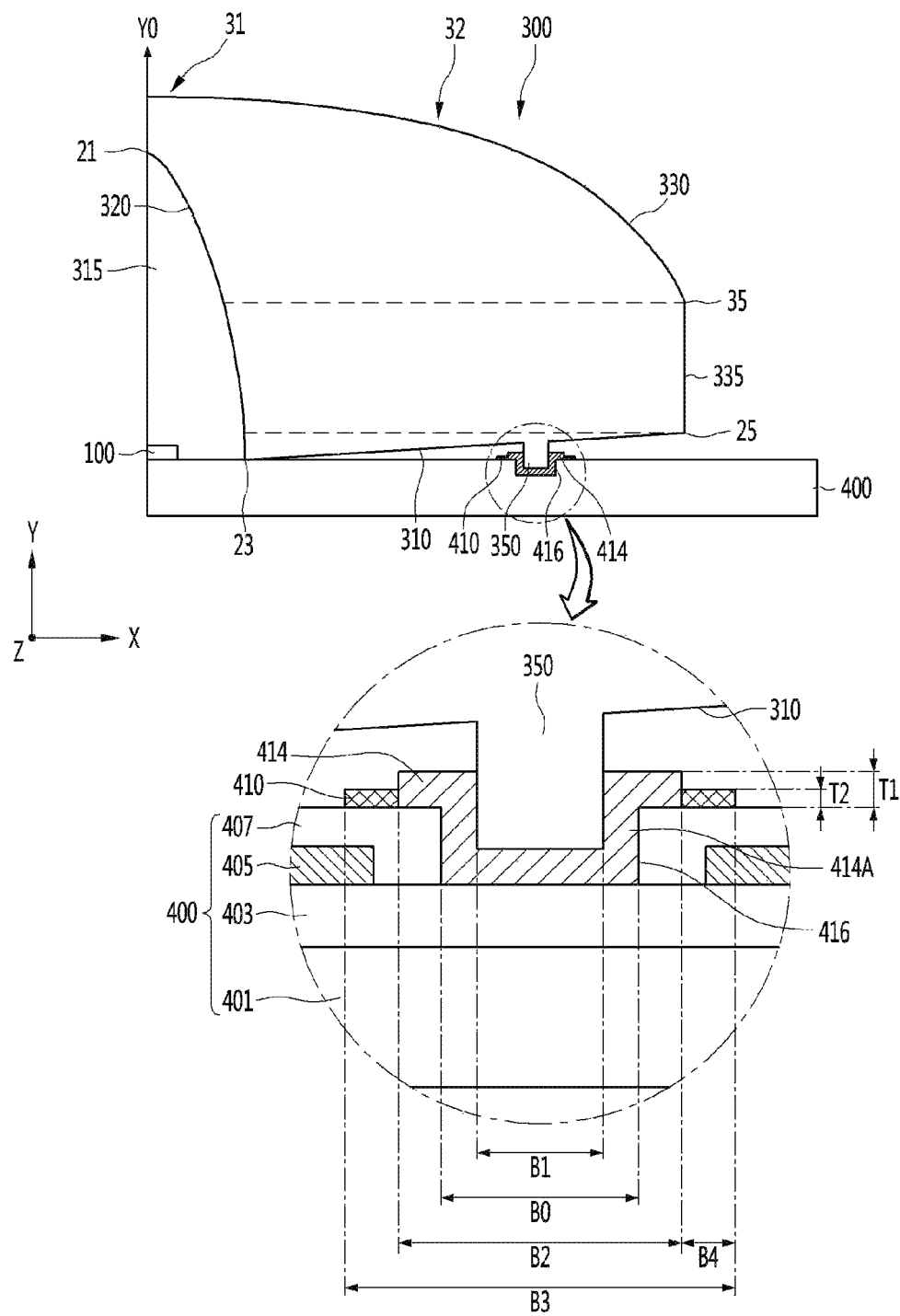
FIG. 10 is an enlarged view showing the absorbing layer of the circuit board, protrusion portions of an optical lens, and a first recess on the circuit board in the lighting module of FIG. 9.

FIG. 1 is a plan view of a lighting module according to an embodiment of the invention, FIG. 2 is a side cross-sectional view of the optical lens of FIG. 1, FIG. 3 is a bottom view of the optical lens of FIG. 1, FIG. 4 is a cross-sectional view taken along line B-B of the lighting module of FIG. 1, FIG. 5 is a cross-sectional view taken along line C-C of the lighting module of FIG. 1, FIG. 6 is a cross-sectional view taken along line A-A of FIG. 1, and is a view for illustrating the path of light, FIG. 7 is a plan view showing a region of brightness portion according to the optical path of FIG. 6, FIG. 8 is a perspective view of an optical lens of a lighting module according to an embodiment of the invention, and is a plan view showing an absorbing layer on a circuit board and protrusion portions of an optical lens, FIG. 9 is an enlarged view of the absorbing layer of the circuit board and the protrusion portion of the optical lens in FIG. 8, FIG. 10 is an enlarged view showing the absorbing layer of the circuit board, protrusion portions of an optical lens, and a first recess on the circuit board in the lighting module of FIG. 9.

FIGS. 1 to 5, a lighting module 301 includes a light emitting device 100, an optical lens 300 disposed on the light emitting device 100, and a circuit board 400 disposed under the light emitting device 100. In the following description, a first direction is the X axis direction or a transverse direction, a second direction is the Z axis direction or a longitudinal direction orthogonal to the first direction, a third direction is a Y axis direction orthogonal to the first and second directions, a height direction or a central axis direction.

At least one or two or more light emitting devices 100 may be disposed under the optical lens 300. The light emitting device 100 may be disposed between the optical lens 300 and the circuit board 400. The light emitting device 100 is driven by receiving power from the circuit board 400 and emits light. The emitted light may be refracted through the optical lens 300 and emitted.

The light emitting device 100 may include at least one of a LED chip having a compound semiconductor, such as an ultraviolet (UV) LED chip, a blue LED chip, a green LED chip, a white LED chip, a red LED chip and infrared rays. The light emitting device 100 may include at least one or both of Group II-VI compound semiconductors and Group III-V compound semiconductors. The light emitting device 100 may emit at least one of blue, green, blue, UV, infrared, or white light. The light emitting device 100 may be defined as a light source. The light emitting device 100 may be disposed on the circuit board 400 as a flip chip, a horizontal chip, or a vertical chip, but the invention is not limited thereto.

Referring to FIG. 4, the light emitting device 100 may include a top surface S1 and a plurality of side surfaces S2. The light emitting device 100 emits light through the top surface S1 and the plurality of side surfaces S2. The light emitting device 100 may include a phosphor layer (not shown) on its surface. The phosphor layer may include at least one or more of red, green, blue, and yellow phosphors. The light emitting device 100 emits light through the top surface S1 and the plurality of side surfaces S2 and has, for example, five or more light emitting surfaces. The plurality of side surfaces S2 of the light emitting device 100 may include at least four side surfaces, and may be a light emitting surface.

The light emitting device 100 may provide light emitting surfaces of five or more sides and increase a distribution of angle of the beam spread of light. The distribution of the angle of the beam spread of the light emitted from the light emitting device 100 may be 130 degrees or more, for example, 140 degrees or more. The FWHM (full width at half maximum) of the distribution of the angle of the beam spread of the light emitting device 100 may be 65 degrees or more, for example, 70 degrees or more. By providing a wide distribution of the angle of the beam spread of light emitted from the light emitting device 100, light diffusion using the optical lens 300 is easier.

As shown in FIGS. 2 and 3, the optical lens 300 may change the path of the light emitted from the light emitting device 100 and then extract the light through an outer. The lengths D5 and D4 of the optical lens 300 in the first and second directions may be greater than the thickness D3 of the optical lens 300. A values of the lengths D5 and D4 may be 2.5 times or more, for example, 3 times or more of a value of the thickness D3. The lengths D5 and D4 in the first and second directions of the optical lens 300 may be 14 mm or more. The optical lens 300 may be an isotropic lens having lengths D5 and D4 in the first and second directions, or anisotropic lenses having different lengths in either direction. The lengths D5 and D4 in the first and second directions of the optical lens 300 may be set to be wider than the thickness D3 in the above range. Such an optical lens may provide a uniform luminance distribution over the entire region of the light unit, for example, the backlight unit, and may reduce the thickness of the light unit. The body of the optical lens 300 may include at least one of polycarbonate (PC), polymethyl methacrylate (PMMA), silicon or epoxy resin, or glass. The optical lens 300 may include a transparent material having a refractive index ranging from 1.4 to 1.7.

The optical lens 300 includes a bottom surface 310 disposed at the bottom of a lens body, a second recess 315 recessed upward in the center region of the bottom surface 310, an incident surface 320 around the second recess 315, and exit surfaces 330 and 335 on an outer surface of the lens body. For example, the exit surfaces 330 and 335 include a first exit surface 330 having a convex curved surface and a second exit surface 335 disposed at an outer circumference.

The bottom surface 310 of the optical lens 300 may include a horizontal surface, an inclined surface, a flat surface, a curved surface, or a curved surface and a flat surface. The bottom surface 310 may include a sloped surface and/or a curved surface with respect to the top surface of the circuit board 400. The bottom surface 310 may be provided on an inclined surface or/and a curved surface with respect to a horizontal straight line X0 on the top surface of the circuit board 400. The bottom surface 310 may include a reflective surface. The bottom surface 310 may be formed as an even surface, a haze surface having a rough surface, to prevent re-reflection of light or be scattering light.

The bottom surface 310 of the optical lens 300 includes a first edge portion 23 and a second edge portion 25. The first edge portion 23 is a boundary point between the incident surface 320 and the bottom surface 310 and may be a bottom point of the bottom surface 310. The first edge portion 23 may be the lowest point of a region of the bottom surface 310. A position of the first edge portion 23 may be positioned such that a horizontal straight line passing through the first edge portion 23 is lower than the second edge portion 25. The first edge portion 23 may be a lower circumference of the incident surface 320. The second edge portion 25 may be the outer edge of the bottom surface 310. The second edge portion 25 may be a boundary point between the bottom surface 310 and the second exit surface 335. The first edge portion 23 and the second edge portion 25 may be formed on both ends of the bottom surface 310. The bottom view shape connecting the first edge portion 23 may be circular or elliptical, and the bottom view shape connecting the second edge portion 25 may be circular or elliptical. The bottom view shape of the first edge portion 23 and the bottom view shape of the second edge portion 25 may be the same or different from each other.

As shown in FIG. 5, the first edge portion 23 of the bottom surface 310 of the optical lens 300 is disposed closer to the top surface of the circuit board 400 than the second edge portion 25. The first edge portion 23 of the bottom surface 310 may be in contact with the top surface of the circuit board 400 and the second edge portion 25 may be in spaced apart from the top surface of the circuit board 400 at a maximum interval TO. The second edge portion 25 may be disposed at a position lower than the position of the active layer in the light emitting device 100, thereby preventing loss of light. As shown in FIG. 2, the first edge portion 23 may be disposed lower than a horizontal straight line X6 of the second edge portion 25, and a lower portion of the incident surface 320 may face the side surfaces of the light emitting device 100. As shown in FIGS. 4 and 5, an angle θ5 between the top surface of the circuit board 400 and the horizontal line X0 on the bottom surface 310 of the optical lens 300 with respect to the central axis Y0 is less than 5 degrees, and may range, for example, from 0.5 degrees to 4 degrees. The angle θ5 may be an angle between a top surface of the circuit board 400 and a straight line X0 connecting the both edge portions 23 and 25 with respect to the center axis Y0. Since the bottom surface 310 is arranged in a plane or a curved surface having an inclined angle θ5, the bottom surface 310 reflects the light incident through the side surface S2 of the light emitting device 100, may be transmitted through the second exit surface 335 or may be reflected in another direction. The exit angle of the light emitted from the second exit surface 335 may be smaller than the incident angle entered through the incident surface 320. Accordingly, it is possible to reduce optical interference between the optical lens 300 disposed on another adjacent circuit board. In addition to, an amount of light emitted through the second exit surface 335 of the optical lens 300 may be improved.

The second recess 315 is recessed from a predetermined region of the bottom surface 310, for example, from the center region toward the first exit surface 330 or upward of the central axis Y0. The second recess 315 may have a deeper depth toward the center or the first exit surface 330. The center axis Y0 may be perpendicular to the horizontal straight line of the bottom surface 310 or may be an optical axis direction. The direction of the central axis Y0 may be a third direction orthogonal to the top surface of the circuit board 400. The direction of the central axis (Y0 in FIG. 5) may be perpendicular to the first and second directions X and Z.

Referring to FIG. 2, the width of the second recess 315 in the first direction or the second direction may become gradually narrower toward the first apex 21 of the second recess 315. The bottom width D1 of the second recess 315 may have the widest width in the second recess 315. The second recess 315 may have a hemispherical shape or a semi-ellipse shape, and the lower surface of the second recess 315 may have a circular or polygonal shape. The bottom width D1 of the second recess 315 may be the same or different from the first direction X and the second direction Z. The second recess 315 may include an incident surface 320 and the incident surface 320 is disposed around the second recess 315. The incident surface 320 may include a curved surface. The incident surface 320 may be formed of a rotating body having a Bezier curve. The curved line of the incident surface 320 may be a spline, for example, cubic, B-spline, or T-spline. The curved line of the incident surface 320 may be implemented as a Bezier curve.

At least a portion of the light emitting device 100 may be disposed in the second recess 315. The light emitting device 100 may be inserted into the second recess 315. The incident surface 320 may be a surface of the second recess 315 and may be disposed on an outer side of the top surface S1 and the side surface S2 of the light emitting device 100. The incident surface 320 of the optical lens 300 may face the top surface S1 and the plurality of side surfaces S2 of the light emitting device 100. Light emitted from the side surface S2 of the light emitting device 100 is irradiated to the incident surface 320, so that light loss may be reduced. The incident surface 320 refracts the light incident on the second recess 315 at a predetermined angle and provides the light to the exit surfaces 330 and 335.

The bottom width D1 or the diameter of the incident surface 320 of the optical lens 300 may be the bottom width or the diameter of the second recess 315 and may be greater than the width W1 of the light emitting device 100. The incident surface 320 and the second recess 315 have such a size that the light emitted from the light emitting device 100 may be easily incident on the incident surface 320 and the second recess 315.

The depth D2 of the second recess 315 is a distance from the bottom center to the apex of the second recess 315 and is equal to or greater than the bottom width D1 of the second recess 315. The depth D2 of the second recess 315 may have a depth of 75% or more, for example, 80% or more of the thickness D3 of the optical lens 300. The depth D2 of the second recess 315 may be 80% or more of the distance between the apex of the first exit surface 330 and the bottom surface 310 or the first edge 23. Even if the center region 31 of the first exit surface 330 does not have a total flection surface or a negative curvature due to the depth D2 of the second recess 315 being deep, so that the light emitted may be emitted laterally. That is, the incident surface 320 refracts light through the center region 31 adjacent to the apex 21 and the light refracted through the center region 31 may be emitted in an outward direction away from the center axis 31. The depth D2 of the second recess 315 is the depth from the bottom center to the apex 21 of the incident surface 320. The depth of the apex 21 of the incident surface 320 is set to be deep so that the incident light may be refracted in the lateral direction with respect to the light incident on the apex 21 and a peripheral region of the apex.

The ratio D1:W1 of the bottom width D1 of the second recess 315 and the width W1 of the light emitting device 100 may range from 1.8:1 to 3.0:1. When the bottom width D1 of the second recess 315 is set to be equal to or less than three times the width W1 of the light emitting device 100, the light emitted from the light emitting device 100 is incident on the incident surface 320.

The center region 31 of the first exit surface 330 may be a convex curved surface or a flat surface in a region within a predetermined distance from the center axis Y0. The side region 32 between the center region 31 and the second exit surface 335 of the first exit surface 330 may be provided in a convex curved shape. The radius of curvature of the side region 32 may be less than the radius of curvature of the center region 31. The center region 31 is a region overlapping with the second recess 315 in the vertical direction, and the side region 32 is formed in the outer region of the center region 31 and may be a region overlapped with the bottom surface 310 in the vertical direction.

As shown in FIG. 2, the minimum distance D6 between the second recess 315 and the first exit surface 330 is an interval between the apex 21 of the second recess 315 and an apex of the first exit surface 330. The distance D6 may be, for example, 1.5 mm or less, and may range, for example, from 0.6 mm to 1 mm. When the distance D6 between the apex 21 of the second recess 315 and the apex of the first exit surface 330 is more than 1.5 mm, the amount of light that is going to be increased may cause a hot spot phenomenon. When the distance D6 between the apex 21 of the second recess 315 and the second exit surface 31 is less than 0.6 mm, there is a problem that the center side rigidity of the optical lens 300 becomes weak. By arranging the distance D6 between the second recess 315 and the first exit surface 330 within the above range, even if the center region 31 of the second exit surface 335 may not be formed as a total reflection surface or a negative curvature, the light emission path around the center region 31 may be diffused in the horizontal direction. This is because the apex 21 of the second recess 35 is located closer to the convex apex of the first exit surface 330, the light traveling toward the side of the first exit surface 330 through the incident surface 320 may be increased. Therefore, the amount of light diffused in the lateral direction in the center region 31 of the optical lens 300 may be increased. The apex 21 of the second recess 315 may be disposed closer to an apex of a center region of the first exit surface 330 than a straight line X5 extending horizontally from the third edge portion 35 of the second exit surface 335.

The first exit surface 330 includes a curved surface, and the second exit surface 335 includes a flat vertical surface. The first and second exit surfaces 330 and 335 refract light incident through the incident surface 320 at a predetermined angle and emit the light. The first and second exit surfaces 330 and 335 may refract light incident on the incident surface 320 and emit the light as diffused light.

The first exit surface 330 may be formed as a curved surface on which light is emitted in the entire region. The center region 31 of the first exit surface 330 may have an apex or a peak and may include a curved surface continuously connected from an apex of the center region 31. The first exit surface 330 may gradually become larger as the distance from the bottom center of the second recess 315 is away from the central axis (Y0 in FIG. 5). The first exit surface 330 may become larger as the distance from the bottom center of the second recess 315 is away from the apex of the first exit surface 330. At this time, the emission angle after refraction of the light at the first exit surface 330 with respect to the central axis (Y0 in FIG. 5) may be greater than the incidence angle before the refraction. The first exit surface 330 may be formed of a rotating body having a Bezier curve. The curved line of the first exit surface 330 may be a spline, cubic, B-spline, or T-spline. The curve of the first exit surface 330 may be implemented as a Bezier curve. The optical lens 300 may be provided in a rotationally symmetrical shape with respect to the central axis Y0, except for the side protrusion 360.

The incident surface 320 and the first exit surface 330 may have a positive radius of curvature. The center region 31 and the side region 32 of the first exit surface 330 may have different curvatures without having a negative curvature. The center region 31 of the first exit surface 330 may include a region having a curvature of zero. The radius of curvature of the first exit surface 330 may be greater than the radius of curvature of the incident surface 320. As another example, the slope of the first exit surface 330 may be smaller than the slope of the incident surface 320. The vertical straight distance between the incident surface 320 and the center region 31 of the first exit surface 330 may become larger as the distance from the apex 21 of the incident surface 32 increases. The vertical straight line distance between the first exit surface 330 and the bottom surface 310 may be gradually reduced as the distance from the center region 31 increases.

The second exit surface 335 is disposed around the lower surface of the first exit surface 330 to refract the incident light. The second exit surface 335 may be a plane having a vertical or inclined surface. The second exit surface 335 may be, for example, a surface perpendicular to the top surface of the circuit board 400 or a tilted surface. When the second exit surface 335 is formed as an inclined surface, the second exit surface 335 may be easily separated during injection molding. The second exit surface 335 may include a third edge 35 adjacent the first exit surface 330. The third edge portion 35 may be the upper end of the second exit surface 335 or the boundary point between the first and second exit surfaces 330 and 335. The second exit surface 335 may have the second edge portion 25 and the third edge portion 35.

The second exit surface 335 receives some light (L2 in FIG. 6) emitted to the side surface S2 of the light emitting device 100 and refracts the light. At this time, the emission angle of the emitted light may be smaller than the incidence angle before refraction, with respect to the central axis Y0, on the second exit surface 335. Accordingly, the light interference distance (G1 in FIG. 23) between adjacent optical lenses may be prolonged. A part of light emitted through the second exit surface 335 and light emitted to the first exit surface 330 may be mixed with each other at the periphery of the optical lens. As an embodiment, the second exit surface 335 may have an uneven surface. The uneven surface may be formed as a rough haze surface. The uneven surface may be a surface on which scattering particles are formed.

The optical lens 300 includes a side protrusion 360 protruding outermost. The side protrusion 360 protrudes outward from a part of the second exit surface 335 of the optical lens 300. The side protrusion 360 may be disposed in the second direction Z or in the first direction X. When the side protrusion 360 is disposed on the second direction, the side protrusion 360 may protrude outward from the region of the circuit board 400 and may disposed in a region that does not overlap in a vertical direction to the circuit board 400. The side protrusion 360 may be defined as a gate portion, a cut portion, a protrusion, or a mark portion as a cut portion of a region for a gate at the time of injection. One or more side protrusions 360 may be disposed on the optical lens 300. The side protrusion 360 may be formed as a rough surface on the outer side. Here, the rough surface of the side surface protrusion 360 may have a surface roughness higher than the surface roughness of the first exit surface 330. Since the rough surface is provided at a transmittance lower than that of the first exit surface 330, optical interference with other optical lenses may be reduced.

As shown in FIGS. 3 and 5, the optical lens 300 includes a plurality of protrusion portions 350 disposed at a lower portion thereof. The protrusion portion 350 protrudes downward from the bottom surface 310 of the optical lens 300, that is, toward the circuit board 400. A plurality of the protrusion portions 350 may be fixed on the circuit board 400 to support the optical lens 300 and prevent the optical lens 300 from being tilted. A first recess 416 for inserting the protrusion portion 350 may be disposed on the circuit board 400. The first recess 416 may have a predetermined depth and correspond to the protrusion portion 350, respectively. An adhesive member 414 may be disposed on the first recess 416 to adhere the protrusion portion 350. The adhesive member 414 may be a transparent material such as silicone or epoxy, or may be a black or semi-transparent adhesive. The protrusion portion 350 is integrally formed with the lens body and protrudes downward from the bottom surface 310 to support the optical lens 300. The lower portion of the protrusion portion 350 may be disposed lower than the top surface of the circuit board 400 and inserted into the first recess 416.

As shown in FIG. 3, the protrusion portion 350 may be disposed closer to the second edge portion 25 than the first edge portion 23 of the optical lens 300. The protrusion portions 350 may be spaced apart from the bottom center PO by the same distance r1 or at least one of the protrusion portions 350 may be spaced apart from the bottom center PO by a different distance. Here, the distance r1 may be in a range of 0.3 to 0.95 or in a range of 0.82 to 0.85 of the radius of the optical lens 300 or the radius r0 of the bottom surface 310. If the distance r1 is smaller than the range, the tilting problem of the optical lens 300 may occur. When the distance r1 is larger than the above range, a strength decrease may occur near the second edge portion. The radius r0 may be in a range of 14 mm or less, for example, 7 mm to 14 mm, and may vary depending on the size of the lens.

The plurality of protrusion portions 350 is divided into a plurality of regions Q1, Q2, Q3, and Q4 that are divided by a straight line X1 in the first direction X and a straight line Z1 in the second direction. That is, the plurality of protrusion portions 350 may include a first protrusion portion 51 on the first region Q1, a second protrusion portion 52 on the second region Q2, a third protrusion portion 52 on the third region Q3, and a fourth protrusion portion 54 on the fourth region Q4. The first protrusion portions 51 are located in a diagonal direction with the third protrusion portions 53 and may be located on the first protrusion portions 52 in the first direction X and on the fourth protrusion portions 54 in the second direction Z. Here, the distance D31 between the first and second protrusion portions 51 and 52 or the third and fourth protrusion portions 53 and 54 disposed in the first direction is smaller than a distance D31 between the second and third protrusion portions 52 or 53 or a distance between the first and fourth protrusion portions 51 and 54, or it may have a relationship of D31>D32. The distance D32 in the second direction Z may be smaller than the distance D31 in the first direction X, because the size of the circuit board 400 may be increased in proportion to the width of the circuit board 400. Here, the angle between the first protrusion portion 51 and the first straight line X1 may be less than 90 degrees with respect to the bottom center P0. The angle between the first protrusion portion 51 and the second straight line Z1 may be greater than the angle between the first protrusion portion 51 and the first straight line X1 with respect to the bottom center P0. The protrusion portion 350 may be disposed closer to the second exit surface 335 disposed on an outer side of the second recess 315. The protrusion portion 350 may be disposed closer to the second edge portion 25 than the first edge portion 23. Accordingly, the dispersed protrusion portions 350: 51, 52, 53, and 54 may effectively support the optical lens 300.

The circuit board 400 may be arranged in a light unit such as a display device, a terminal, and a lighting device. The circuit board 400 may include a circuit layer electrically connected to the light emitting device 100. The circuit board 400 may include at least one of a resin-made PCB, a metal core PCB (MCPCB), a non-flexible PCB, and a flexible PCB (FPCB), but embodiments are not limited thereto. The circuit board 400 may be any one of a resin PCB, an MCPCB, or a non-flexible PCB capable of supporting the optical lens 300.

Figure 23:
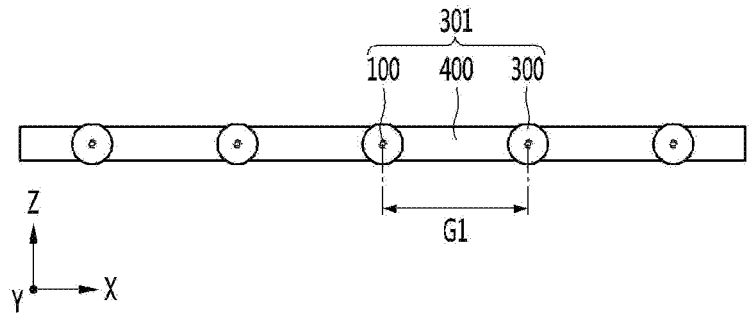
FIG. 23 is a view showing an example in which optical lenses are arranged on a circuit board in a lighting module according to an embodiment of the invention.
Figure 24:
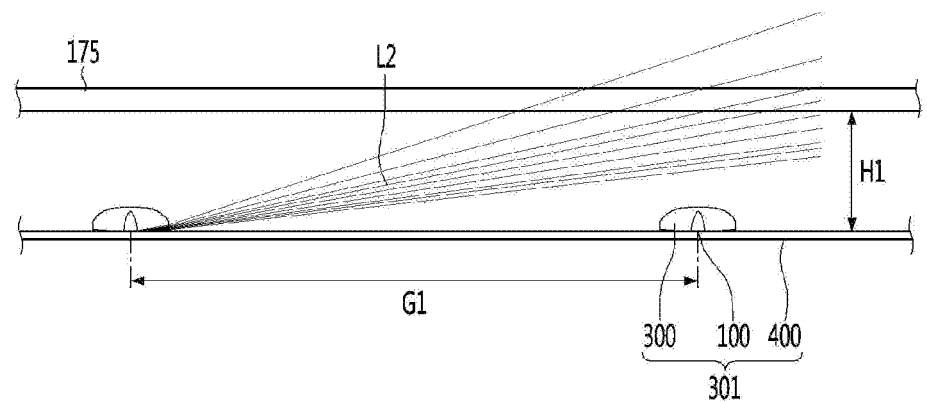
FIG. 24 is a view showing an example in which an optical sheet is disposed on a lighting module according to an embodiment of the invention.

As shown in FIG. 1, the circuit board 400 may have a length longer than the length D13 of the second direction Z in the first direction X in the top view. One optical lens 300 may be disposed in the first direction X of the circuit board 400 or two or more optical lenses 300 may be arranged as shown in FIGS. 23 and 24. The length of the circuit board 400 in the first direction may be twice or more than the length D5 of the optical lens 300 in the first direction and the length D13 in the second direction may be equal to or greater than twice the length D5 of the optical lens 300, and may be less than or equal to one time the length D4 in the two directions. Since the length D13 of the circuit board 400 in the second direction Z is less than or equal to the length D4 of the optical lens 300 in the second direction, the size of the circuit board 400 may be minimized. The intervals G1 and G2 between the optical lenses in the first and second directions may be larger in the first direction as the FWHM is increased by the absorbing layer. Here, it may have a relationship of G1>G2, the interval G1 may range from 55 mm to 75 mm, and a distance difference between the interval G1 and the interval G2 may be 5 mm or more. These intervals G1 and G2 may vary depending on the image quality of the light unit and the size of the application product.

As shown in FIG. 10, the circuit board 400 may include a plurality of layers 401, 403, 404, and 407. The plurality of layers 401, 403, 405 and 407 includes a first layer 401 of a bottom, a second layer 403 on the first layer 401, a third layer 405 on the second layer 403, and a fourth layer 407 on the third layer 405. The first layer 401 may include at least one of a metal material such as Al, Cu, and Fe, or an alloy thereof, and may be used as a heat dissipation plate. The thickness of the first layer 401 may be thicker than the other layers for the heat dissipation efficiency, and may be, for example, 0.8 mm to 1.5 mm. As another example, the first layer 401 may include a ceramic material. The second layer 403 may include, for example, pre-impregnated materials as an insulating material. The second layer 403 may include an epoxy resin, a phenol resin, an unsaturated polyester resin, or the like. The second layer 403 may be formed by adding a material such as graphene to an insulating material such as silicon or epoxy, and is not limited thereto. The second layer 403 may be an anodized region, and the anodized region may be formed of a material such as $Al_2O_3$. The third layer 405 may be a wiring layer and may include a circuit pattern and may be electrically connected to the light emitting device. The third layer 405 may include at least one of Cu, Au, Al, and Ag, or an alloy thereof, for example, Cu may be used. The fourth layer 407 is a layer for protecting the circuit pattern, and may be an insulating material. The fourth layer 407 includes a solder resist, and the solder resist protects a region other than the pad on the top surface of the circuit board 400. When the plurality of light emitting devices are arranged, the light emitting devices may be arranged in a serial, parallel, and serial/parallel mixed structure by the circuit pattern of the third layer 405. A portion of the third layer 405 may be exposed or spaced from the first recess 416.

Referring to FIGS. 6 and 7, the light emitted from the light emitting device 100 in the lighting module passes through the incident surface 320 to the first exit surface 330 and the second exit surface 335. The first exit surface 330 refracts light L1 and L5 incident from the incident surface 320 and emits the light. The second exit surface 335 refracts the light L2 incident on the incident surface 320 or the light reflected by the bottom surface 310 and emits the light.

Since the first exit surface 330 is disposed in a curved surface, a part L6 of the incident light may be reflected toward the bottom surface 310. The light L6 reflected by the first exit surface 330 forms a region (a region of a brightness portion) R0 through the bottom surface 310 by the curvature of the first exit surface 330. The region of a brightness portion R0 may be a region where the luminance of light transmitted to the bottom surface 310 of the region of the bottom surface 310 is 80% or more of the peak value. A portion of the light traveling to the bottom surface 310 may be reflected (L8) to the center region 31.

The angle region θ1 of brightness portion R0 with the bottom center of the lens or the bottom center PO of the second recess 315 based on the first exit surface 330 may be in the range of an acute angle, for example, 45 to 85 degrees. The interior angle of a triangle connecting the center of the protrusion portion 350 and the bottom center P0 based on the first exit surface 330 may range from 45 degrees to 85 degrees, and it is possible to arrange the absorbing layer 410 in the periphery to control light absorption in the brightness portion R0.

As shown in FIG. 7, the brightness portion R0 may be formed in the shape of a circular ring or an elliptical ring when viewed from the top view. The light L6 transmitted to the brightness portion R0 is reflected on the circuit board 400 and a light L8 passes through the center region 31 of the first exit surface 330, and there is a problem that the light L8 traveling to the center region 31 increases the central luminance (the comparative example in FIG. 28). If the center luminance of the optical lens 300 is increased, uniformity of light may be lowered, hot spots may be generated, and uniform luminance distribution control may be difficult. As the absorbing layer according to the embodiment of the invention is disposed in at least part of the brightness portion R0 as shown in FIG. 5, the increase in central brightness may be suppressed and the uniformity of light may be improved. The absorbing layer of the embodiment is disposed on the circuit board 400 around the protrusion portion 350 with high light intensity so as to suppress the light due to the reflection, scattering, and refraction by the protrusion portion 350 from traveling to the center region 31.

As shown in FIGS. 5 and 8, the absorbing layer 410 may be disposed on the circuit board 400. The absorbing layer 410 may be disposed on the fourth layer 407 (see FIG. 10) of the circuit board 400. The circuit board 400 may include the absorbing layer 410. The absorbing layer 410 may be disposed in a region overlapping with the bottom surface 310 of the optical lens 300 in the vertical direction. The absorbing layer 410 may overlap the side regions 32 of the first exit surface 330 of the optical lens 300 in the vertical direction. The absorbing layer 410 may be disposed, for example, in regions dispersed to each other. The absorber layer 410 may include a material having a higher absorption rate than reflectance, for example, a black ink, or a black resist material. The absorbing layer 410 may be formed of a silk screen material. The thickness of the absorbing layer 410 may be set to 20 μm or less, for example, in the range of 10 μm to 20 μm, and the light absorption rate is high within the above range. When it is smaller than the above range, the light absorption rate is lowered, and if it is thicker than the above range, the increase in absorption efficiency may be minimal.

The absorbing layer 410 may be disposed around all or at least one of the plurality of protrusion portions 350 of the optical lens 300. The light reflected from the first exit surface 330 proceeds to the region of brightness portion R0 and the protrusion portion 350 located in the brightness portion R0 moves toward the region of brightness portion R0, or scattered or refracted. Light may be scattered or reflected by the protrusion portion 350 located in the region of the illuminated region R0, and the brightness of the peripheral region may be increased to affect the center luminance. Since the absorbing layer 410 according to the embodiment of the invention is disposed around the protrusion portion 350, the absorbing layer 410 absorbs the light incident on the periphery of the protrusion portion 350, and it is possible to suppress the influence on the luminance by the periphery of the protrusion portion 350. The size of the peripheral region of the protrusion portion 350 may be equal to or less than twice the diameter of the protrusion portion 350 with respect to the center of the protrusion portion 350.

When a bottom of each of the protrusion portions 350 may be a circular shape, the bottom diameter B1 may be 1.4 mm or more, for example, in a range of 1.4 mm to 1.8 mm. If the bottom diameter B1 of the protrusion portion 350 is smaller than the above range, molding may be difficult or broken. If the bottom diameter B1 is larger than the above range, optical loss may be increased or optical path control may be difficult. When the bottom diameter B1 of the protrusion portion 350 is larger than the above range, alignment for insertion into the first recess 416 of the circuit board 400 may be difficult, and diffuse light may be increased, thereby making it difficult to control light distribution. The outer height and the inner height of the protrusion portion 350 may be equal to or different from each other. When the outer height and the inner height of the protrusion portion 350 are different from each other, the inner height may be lower than the outer height. The maximum height of the protrusion portions 350 may be greater than the maximum distance T0 between the circuit board 400 and the bottom surface 310 of the optical lens 300 so that the protrusion portions 350 may protrude from the circuit board 400. The protrusion portions 350 may be inserted into the first recess 416, which is lower than the top surface of the circuit board 400.

As shown in FIGS. 8 and 9, the absorbing layer 410 may be disposed along the circumference of the protrusion portion 350, respectively. The absorbing layer 410 absorbs the light incident on the periphery of the protrusion portion 350 and the light scattered or reflected by the protrusion portion 350 and may be suppressed from affecting the central luminance by the protrusion portion 350 and its surroundings.

The absorbing layer 410 may be formed into a ring shape or a circular arc shape along the periphery of the protrusion portion 350, when the bottom shape of the protrusion portion 350 is a circular shape. The line width or ring width B4 of the absorbing layer 410 may be in a range of 0.2 mm or more, for example, 0.2 mm to 0.6 mm. Since the absorbing layer 410 has the width B4, a center luminance may be lowered and a luminance of a region other than the region of the center luminance may be prevented from being lowered. If the width B4 of the absorbing layer 410 is less than the above range, the absorbing region of the light decreases, and the effect of lowering the central brightness may be insignificant. If the width is larger than the above range, the light intensity other than the central brightness may be affected. As the width B4 of the absorbing layer 410 increases, the absorbing region increases and the amount of decrease in the center luminance may be increased. The center luminance may be reduced by 2% to 7% as compared with the comparative example by the width B4 of the absorbing layer 410 (see FIG. 28).

The diameter or width B3 of the absorbing layer 410 may be larger than the diameter or width B1 of the protrusion portion 350. When the absorbing layer 410 has a ring shape and a side cross section of the protrusion portion 350 has a circular shape, an outer diameter B3 as the diameter or the maximum width of the absorbing layer 410 may be a distance of the maximum straight line in the absorbing layer 410. The outer diameter B3 of the absorbing layer 410 may be 4 mm or less, for example, in the range of 2 mm to 4 mm. The ring width or line width B4 of the absorbing layer 410 may be 0.4 times or less, for example, in a range of 0.12 times to 0.4 times the diameter B1 of the protrusion portion 350. The width of the absorbing layer 410 may be in the range of 0.17 times or less, for example, 0.05 times to 0.17 times the diameter B3. When the width of the absorbing layer 410 is smaller than the range, the decrease in the central luminance is small or the change on a visual may not be detected, and when the width of the absorbing layer 410 is larger than the range, a dark portion may be generated on the lens.

The absorbing layer 410 may be spaced from the outer periphery of the protrusion portion 350 by a distance of 0.5 mm or more, for example, in a range of 0.5 mm to 0.7 mm, so that the absorbing layer 410 may absorb light incident on the periphery of the protrusion portion 350.

Here, as shown in FIG. 9, the radius of the optical lens 300 or the radius of the bottom surface 310 is r0, and the distance from the bottom center P0 to the center of the protrusion portion 350 or the center of the absorbing layer 410 is r1, the radius of the protrusion portion 350 is r2 and the outer diameter of the absorbing layer 410 or the distance from the center of the protrusion portion 350 to the outer diameter of the absorbing layer 410 is r3. Here, r1/r0 is less than 1, for example, may be in the range of 0.3 to 0.95. The absorbing layer 410 having such an outer diameter may lower the central brightness through light absorption around the protrusion portion 350 disposed in the region of the brightness portion. In addition to, the r3 is positioned in an region of 2.5 times or less of the radius r2 of the protrusion portion 350, for example, in a range of 1.3 times or more and 2.5 times or less of the radius r2 of the protrusion portion 350 so that the absorption area (i.e., top surface) of the absorbing layer 410 around the protrusion portion 350 may be adjusted to lower the center luminance.

The absorbing layer 410 is wrapped around each of the protrusion portions 350. The area of the individual absorbing layer 410 surrounding each of the protrusion portions 350 (i.e., the area of the top surface) is smaller or greater than a bottom area (i.e., an area of the cross section of part) of the protrusion portions 350. When the area of the absorbing layer 410 is smaller than the area of the protrusion portions 350, the absorbing layer 410 may be disposed on the entire circumference of the protrusion portions 350. As shown in FIGS. 14 to 20, when the area of each of the absorbing layers 410 is smaller than the bottom area of each of the protrusion portions 350, the absorbing layer 410 may be disposed in a part of each of the protrusion portions 350. When the area of the absorbing layer 410 is larger than the bottom area of the protrusion portions 350, the absorbing layer 410 may be disposed on the entire periphery of each of the protrusion portions 350. As shown in FIGS. 14 to 20, when the area of the absorbing layer 410 is larger than the bottom area of each of the protrusion portions 350, the absorbing layer 410 may be disposed in a part of the protrusions 350.

Here, when the bottom surface area of the lens is 100%, the total bottom surface area of the protrusion portions is 5% or less, for example, 3% to 5% based on the bottom surface area of the lens, and the total top surface of the absorbing layer 410 may range from 2% to 11% based on the bottom surface area of the lens. When the total area of the absorbing layer 410 is less than the above range, the decrease in the center luminance is small or the change on the visual may not be detected. When the total area of the absorbing layer 410 is larger than the above range, a dark portion may be generated on the lens. Therefore, the area of the absorbing layer 410 may be adjusted to a range of 2% to 11% with respect to the bottom area of the lens within the width where the center luminance may be reduced.

The number of the absorbing layers 410 may be increased in proportion to the number of the protrusion portions 350. Therefore, when the number of the absorbing layers 410 located around the protrusion portions 350 and the protrusion portions 350 is n: n (n is 3 or more), the areas of the n absorbing layers 410 is equal to or less than 2.6 times a bottom areas of n protrusion portions, for example, in the range of 0.75 to 2.6 times. When the area of the absorbing layer 410 is less than the above range, the decrease in the center luminance is small or the change on the visual may not be detected, and when the area of the absorbing layer 410 is larger than the above range, a dark portion may generated on the lens.

Referring to FIGS. 9 and 10, the absorbing layer 410 may be disposed around the first recess 416 of the circuit board 400. The absorbing layer 410 may be disposed on the fourth layer 407 of the circuit board 400. The thickness T1 of the absorbing layer 410 may be less than the thickness of the second layer 403.

An adhesive members 414 may be disposed between the protrusion portions 350 and the absorbing layer 410. A portion 414A of the adhesive member 414 may be disposed in the first recess 416 of the circuit board 400 to adhere the lower portion of the protrusion portion 350. The width or diameter B0 of the first recess 416 may be greater than the width or diameter B1 of the protrusion portion 350 and less than the width or diameter B2 of the adhesive member 414. The adhesive member 414 may be disposed around the protrusion portion 350 and extend to the top surface of the circuit board 400. The adhesive member 414 may fix the protrusion portion 350 to the circuit board 400 and prevent the protrusion portion 350 from tilting or flowing. The adhesive member 414 may be in contact with the absorbing layer 410. The absorbing layer 410 may serve as a dam to prevent the adhesive member 414 from overflowing in the process of bonding the protrusion portions 350. The adhesive member 414 may comprise a material such as silicone or epoxy.

The thickness T1 of the adhesive member 414 extending over the top surface of the circuit board 400 may be greater than the thickness T2 of the absorbing layer 410. The contact area of the adhesive member 414 with the protrusion portion 350 may be increased by the absorbing layer 410. That is, the top surface of the adhesive member 414 is disposed higher than the top surface of the circuit board 400, and the contact area with the periphery of the protrusion portion 350 may be increased.

Figure 28:
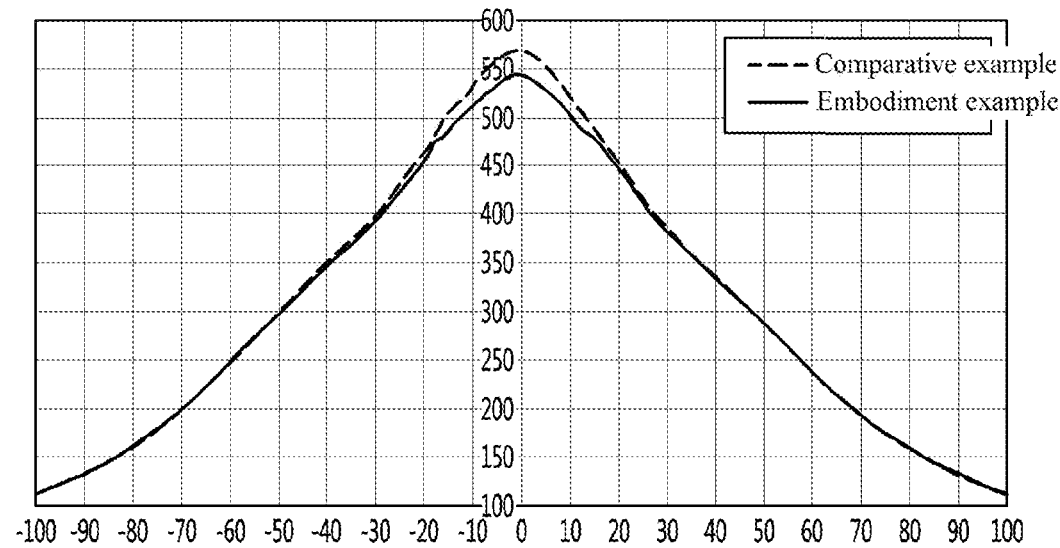
FIG. 28 is a graph comparing the center luminance of light emitted from the optical lens according to the embodiment of the invention and the comparative example.
Figure 29:
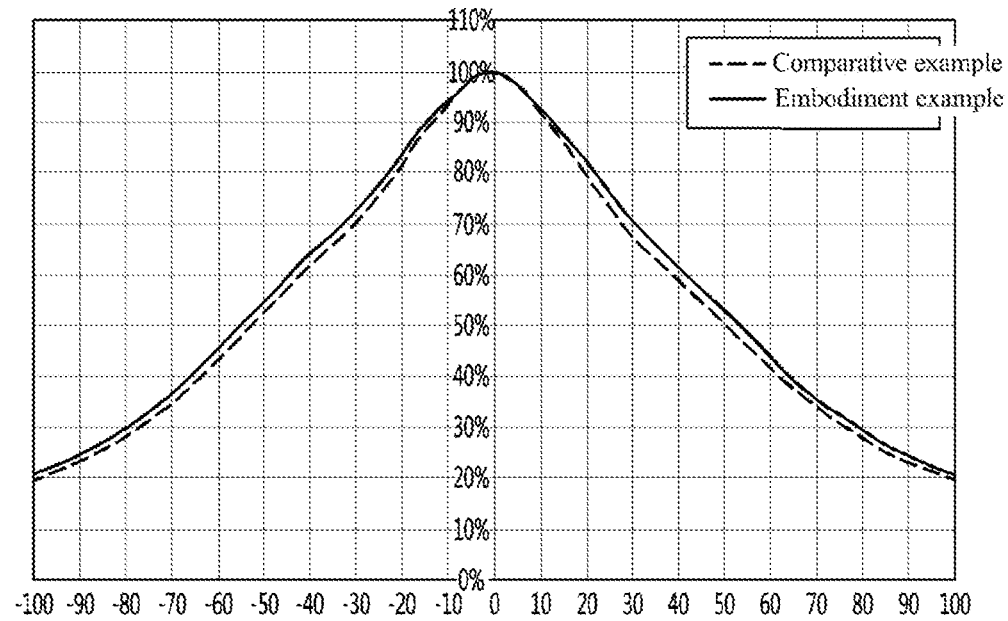
FIG. 29 is a graph comparing FWHM (full width at half maximum) of light emitted from an optical lens according to examples of the invention and comparative examples.

The lighting module according to the embodiment of the invention may lower the center luminance and further improve the FWHM of light by disposing the absorbing layer around the protrusion portion of the optical lens on the circuit board. That is, as shown in FIG. 28, the center luminance of the embodiment may be lower than the center luminance of the comparative example, as compared with the comparative example in which the absorbing layer is not provided, and it is possible to control the center luminance. The horizontal direction in FIG. 28 is the distance (mm) from the lens center (0), and the vertical direction represents the intensity of the center luminance. Further, as shown in FIG. 29, the FWHM of the embodiment may be increased as compared with the comparative example in which the absorbing layer is not provided, and the light uniformity is improved. In FIG. 29, the horizontal direction is a distance (mm) from the lens center (0), and the vertical direction is the graph of the wavelength intensity.

Figure 11:
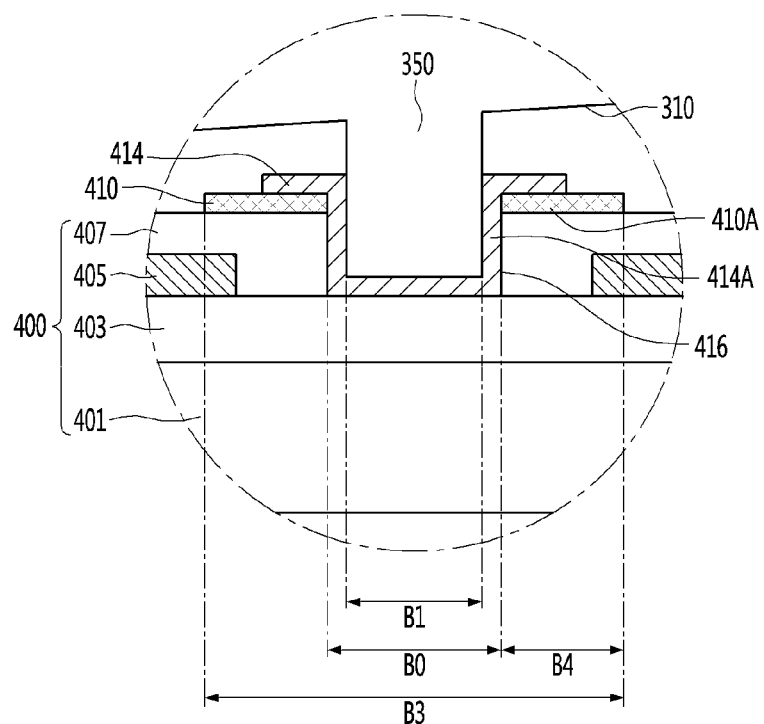
FIG. 11 is another example of the absorbing layer in FIG. 10.

FIG. 11 is another example of the absorbing layer of FIG. 10. As shown in FIG. 11, the inner side portion 410A of the absorbing layer 410 may be overlapped with the adhesive member 414 extending on the circuit board 400 in the vertical direction. The inner side portion 410A of the absorbing layer 410 may be disposed between the adhesive member 414 and the top surface of the circuit board 400 to absorb light incident through the adhesive member 414. Since the top surface area of the absorbing layer 410 is wider, the light may be incident through the protrusion portions 350 or absorb light incident through the surface of the protrusion portions 350. Accordingly, the absorbing layer 410 may suppress the central brightness through absorption of light at the protrusion portion 350 and its surroundings.

Figure 12:
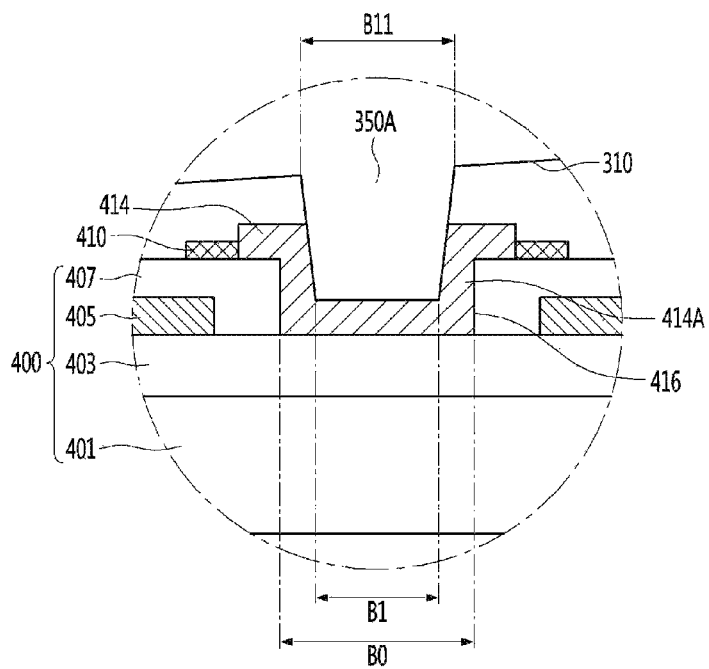
FIG. 12 is another example of the protrusion portion in FIG. 10.

FIG. 12 is another example of the projecting portion of FIG. 10. Referring to FIG. 12, the protrusion portion 350A of the optical lens may have an upper width or an upper diameter B11 greater than a lower width or a lower diameter B1. The upper width or diameter B11 of the protrusion portion 350A is wider than the lower width or diameter B1 so that the protrusion portion 350A may be stably supported on the first recess 416 of the circuit board 400. Since the upper width B11 of the protrusion portion 350 is wider, the adhesive area with the adhesive member 414 may be further increased. The upper width or diameter B11 of the protrusion portion 350A may be smaller than the width or the diameter B0 of the first recess 416. Since the protrusion portion 350A has a gradually smaller diameter as it goes down, it may be easily inserted into the first recess 416.

Figure 13:
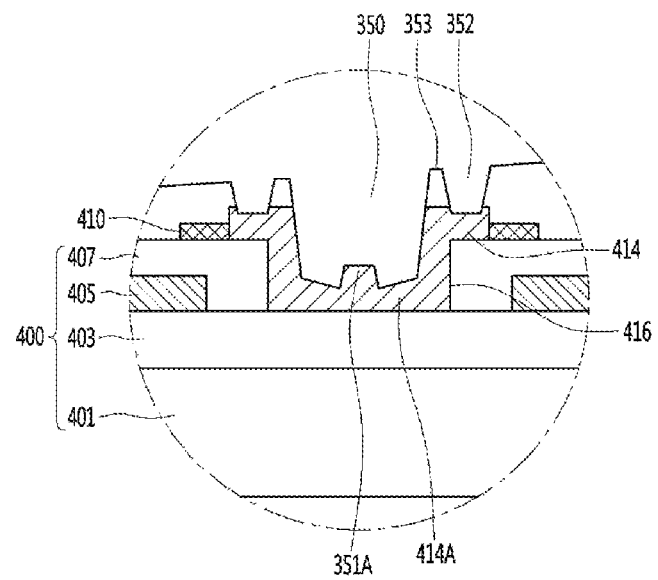
FIG. 13 is another example of the protrusion portion in FIG. 10.

FIG. 13 is another example of the projecting portion of FIG. 10. Referring to FIG. 13, the protrusion portion 350 of the optical lens may have an upper width larger than a lower width. The protrusion portion 350 may be provided with a concave region 351A at the bottom so that the bonding area with the portion 414A of the bonding member 414 may be increased. The protrusion portion 350 has a convex protrusion 352 and a concave groove 353 inside the protrusion 352. The protrusion 352 has a ring shape along the periphery of the protrusion portion 350, and may protrude to a height lower than the height of the protrusion portions 350. The protrusion 352 may be adhered to the adhesive member 414 extending on the circuit board 400. The adhesive member 414 may be partially adhered to the concave groove 353 between the protrusion portion 350 and the protrusion 352.

Figure 14:
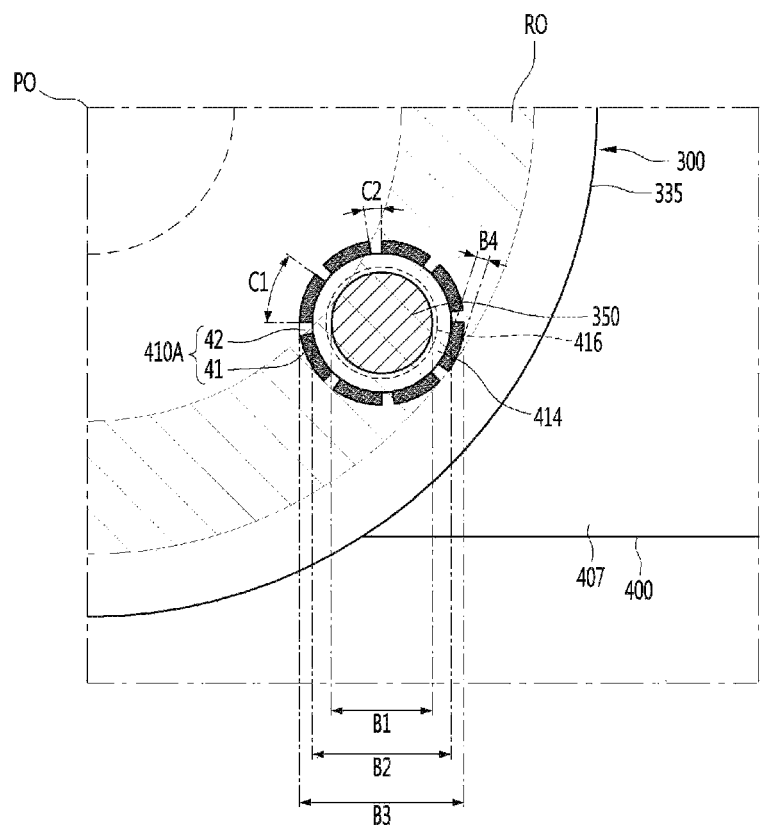
FIG. 14 is a first modification of the absorbing layer in the lighting module of FIG. 7.

FIG. 14 is a first modification of the absorbing layer of FIG. 7. Referring to FIG. 14, the absorbing layer 410A may include a plurality of absorbing regions 41 and spaces 42 disposed along the periphery of the protrusion portions 350. The absorbing region 41 and the space 42 may be arranged alternately. The top surface area of the absorbing region 41 in the absorbing layer 410 is arranged to be larger than the area of the space 42, so that the lowering of the light absorption rate may be prevented. The space 42 may be arranged at a predetermined angle C2 between two adjacent absorbing regions 41 so that the absorbing regions 41 may be arranged in a predetermined size and shape. The angle C2 formed by the space 42 may be 15 degrees or less, for example, in the range of 5 degrees to 15 degrees. The angle C1 formed by each of the absorbing regions 41 is larger than the angle C2 (C2<C1), and may be 45 degrees or less, for example, in a range of 35 degrees to 45 degrees. When the angle C2 formed by the space 42 is larger or smaller than the above range, the number of the absorbing regions 41 may be reduced or the size of the absorbing region 41 may be changed. The angle C2 of the space 42 may be adjusted. The adhesive member 414 may be disposed on the space 42, but the invention is not limited thereto.

Figure 15:
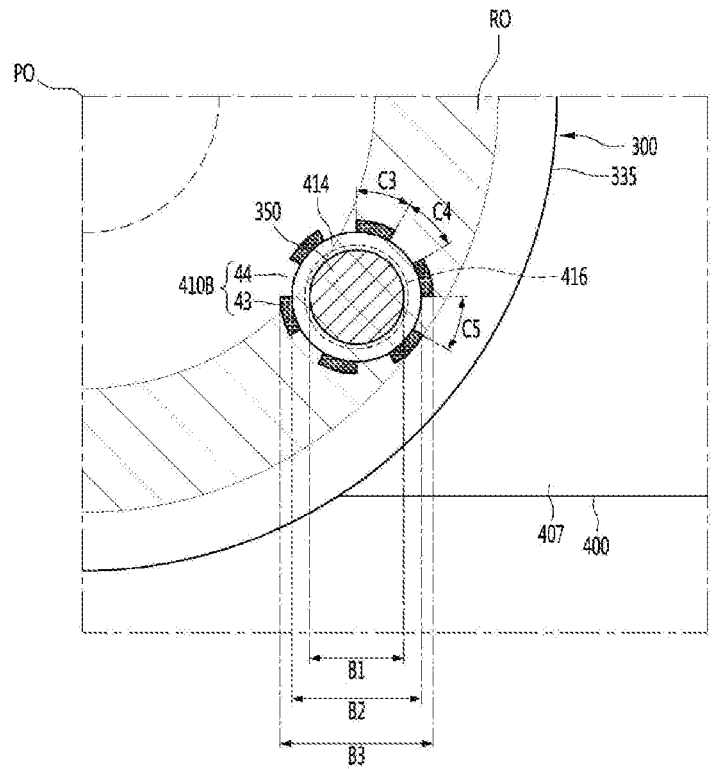
FIG. 15 is a second modification of the absorbing layer in the lighting module of FIG. 7.

FIG. 15 is a second modification of the absorbing layer of FIG. 7. Referring to FIG. 15, the absorbing layer 410B includes an absorbing region 43 and a space 44, and the absorbing region 43 and the space 44 may be alternately arranged. The circular arc length C3 of the absorbing region 43 may be equal to the circular arc length C4 of the space 44. For example, when the circular arc length C4 of the space 44 is equal to the circular arc length C3 of the absorbing region 43, light reflection and absorption around the protrusion portion 350 may be made uniform.

Figure 16:
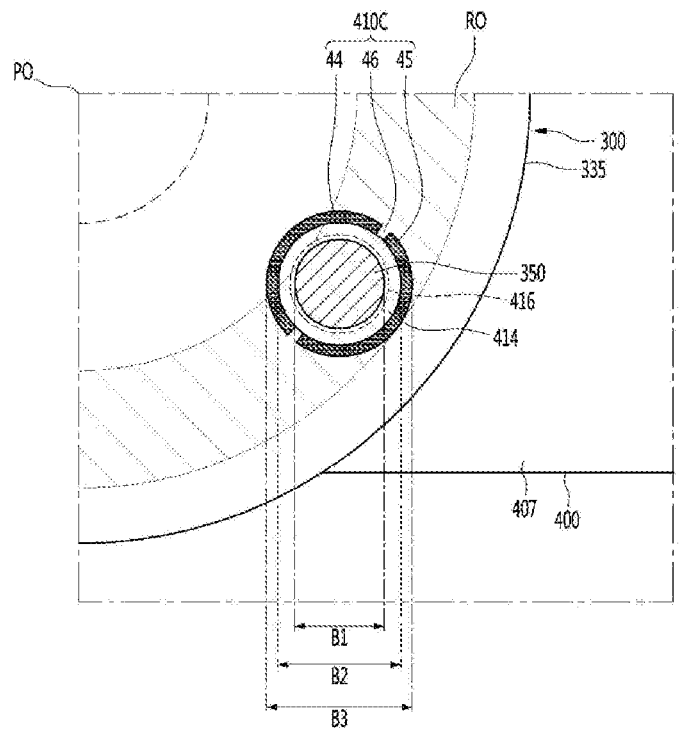
FIG. 16 is a third modification of the absorbing layer in the lighting module of FIG. 7.

FIG. 16 is a third modification of the absorbing layer of FIG. 7. Referring to FIG. 16, the absorbing layer 410C includes first and second absorbing regions 44 and 45 separated by spaces 46 on both sides of the protrusion portion 350, and the lengths of the circular arc of the first and second absorbing regions 44 and 45 may be the same. The length of the circular arc of the first and second absorbing regions 44 and 45 may be ⅓ or less than ½ of the length of the circular arc of the absorbing layer 410. The positions of the spaces 46 may be disposed on opposite sides of the protrusion portions 350 along a ring-shaped luminance region.

Figure 17:
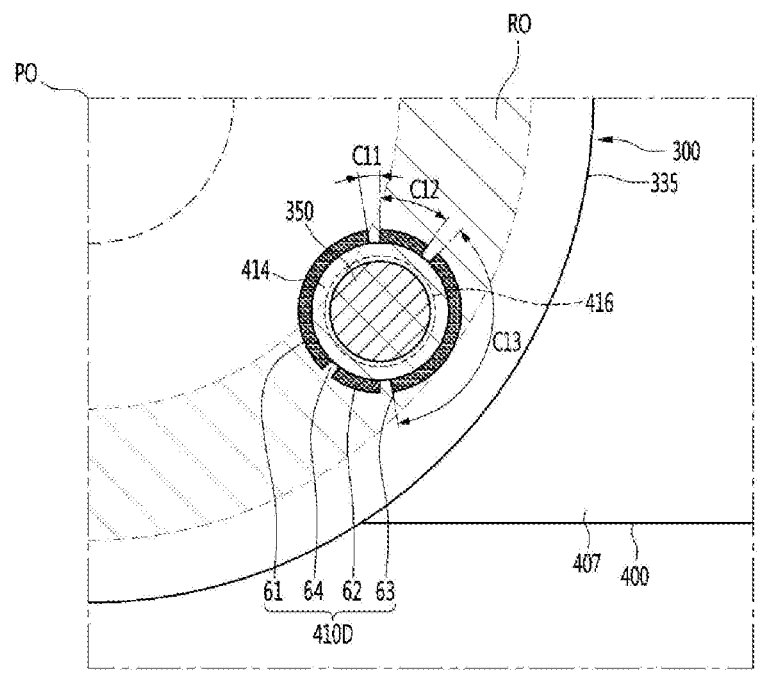
FIG. 17 is a fourth modification of the absorbing layer in the lighting module of FIG. 7.

FIG. 17 is a fourth modification of the absorbing layer of FIG. 7. Referring to FIG. 17, the absorbing layer 410D includes absorbing regions 61, 62 and 63 having different sizes of the protrusion portions 350 and a space 64 between the absorbing regions 61, 62 and 63. The absorbing regions 61, 62 and 63 having different sizes includes first and second absorbing regions 61 and 63 having a first circular arc length C13, and a third absorbing region 62 having a second circular arc length C12 smaller than the first circular arc length C13 and between the first and second absorbing regions 61 and 63. The first circular arc length C13 may be 1.5 times or more, for example, in a range of 1.5 times to 3 times the second circular arc length C12, so that the reduction of the absorbing area may be minimized. The angle C11 formed by the space 64 may be 5 degrees or more, for example, in a range of 5 degrees to 15 degrees. The positions of the spaces 64 may be arranged on a region of the brightness portion, but the invention is not limited thereto.

Figure 18:
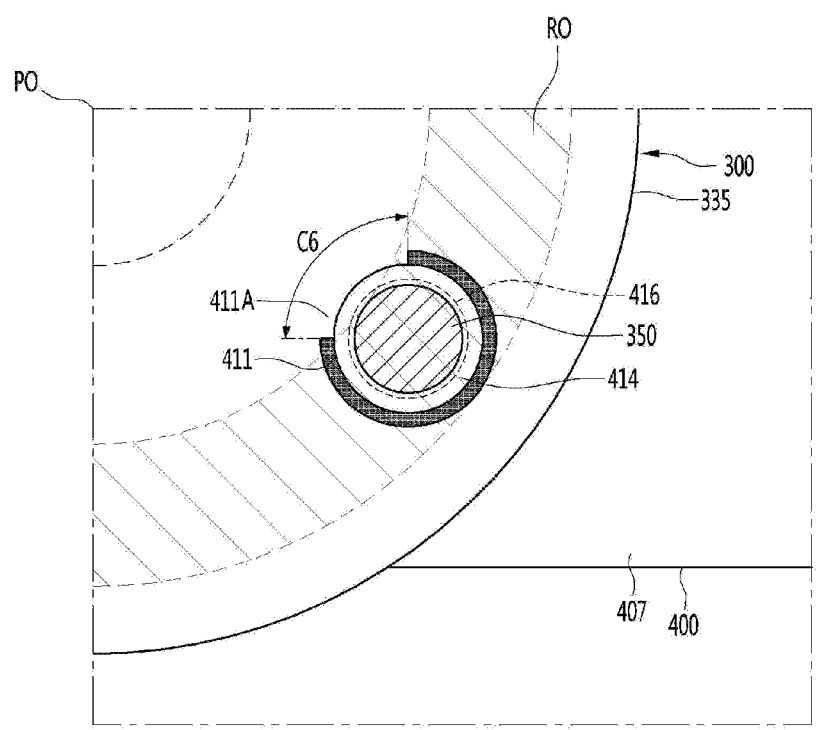
FIG. 18 is a fifth modification of the absorbing layer in the lighting module of FIG. 7.

FIG. 18 is a fifth modification of the absorbing layer of FIG. 7. Referring to, FIG. 18, the absorbing layer 411 includes a region having a circular arc length of ⅗ or more around the protrusion portion 350, and a space 411A is disposed between the absorbing regions. The space 411A may be disposed closer to the center P0 of the optical lens than the protrusion portion 350. The ring width of the absorbing layer 411 is provided to be equal to or wider than the width of another absorbing region (B4 in FIG. 9), so that the decrease of the absorption rate due to the area difference may be prevented.

Figure 19:
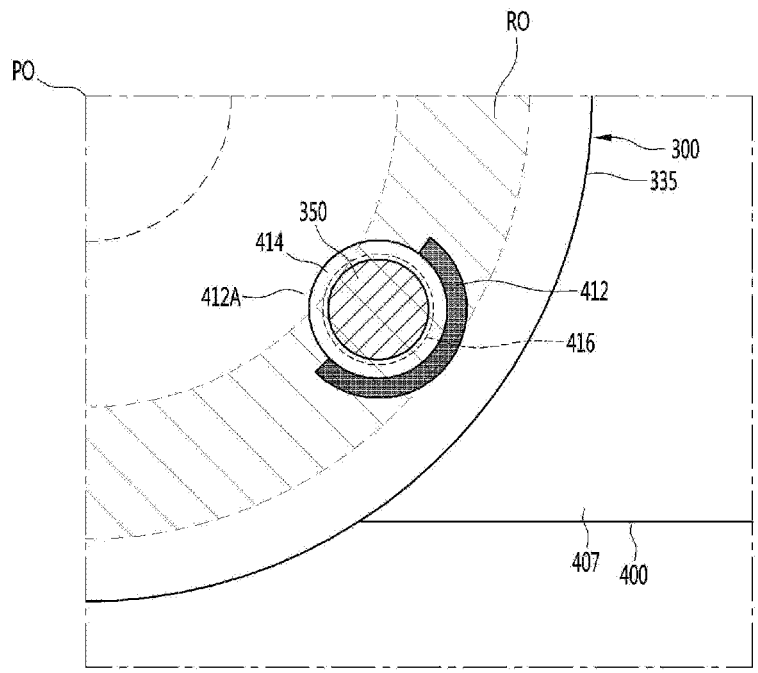
FIG. 19 is a sixth modification of the absorbing layer in the lighting module of FIG. 7.

FIG. 19 is a modification of the absorbing layer of FIG. 7. Referring to FIG. 19, the absorbing layer 412 includes a region having a ½ of a circular arc length around the protrusion portion 350, and a space 412A is disposed between the regions of the absorbing layer 412. The region width of the absorbing layer 412 may be equal to or wider than the width of the absorbing region of another modification (B4 in FIG. 9). Accordingly, it is possible to minimize the reduction of the absorption area around the protrusion portion 350. The space 412 may be disposed closer to the bottom center P0 of the lens than the absorbing layer 412 so that light absorption outside the protrusion portion 350 may be effectively performed.

Figure 20:
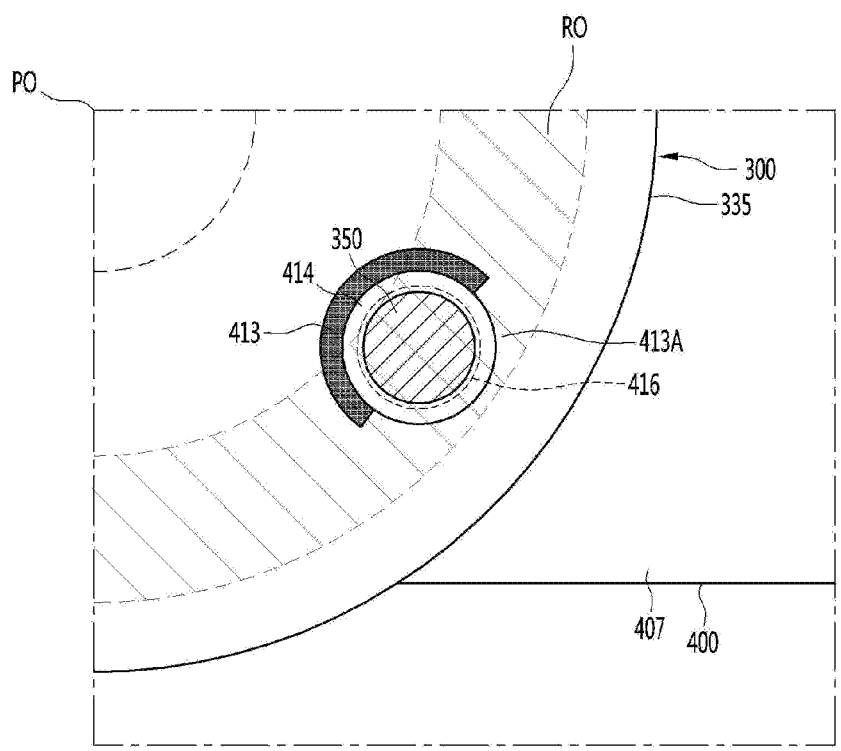
FIG. 20 is a seventh modification of the absorbing layer in the lighting module of FIG. 7.

FIG. 20 is a modification of the absorbing layer of FIG. 7. Referring to FIG. 20, the absorbing layer 413 includes a region having a ½ of a circular arc length around the protrusion portion 350, and a space 413A is disposed between the regions of the absorbing layer 413. The region width of the absorbing layer 413 may be equal to or wider than the width of the absorbing area of another modification (B4 in FIG. 9). Accordingly, it is possible to minimize the reduction of the absorption area around the protrusion portion 350. The space 413A may be disposed farther from the bottom center P0 of the lens than the absorbing layer 413 so that the absorbing layer 413 may effectively absorb the light inside the protrusion portion 350.

As another example, when the absorbing layer is disposed with one or more absorbing regions, the absorbing region may have the same or different thicknesses. For example, when the thickness of the absorbing region is different, the thickness of the absorbing region disposed outside the protrusion portion may be thinner than the thickness of the absorbing region disposed inside. Therefore, the light reflected by the inner absorbing region may be cut off, thereby preventing the influence on the center luminance.

Although the embodiment has been described with respect to a center area having a convex curved surface of the first exit surface of the optical lens, when the first exit surface has a curved surface and the center region has a concave upper portion, a region of the brightness portion is disposed on the bottom of the optical lens.

Figure 21:
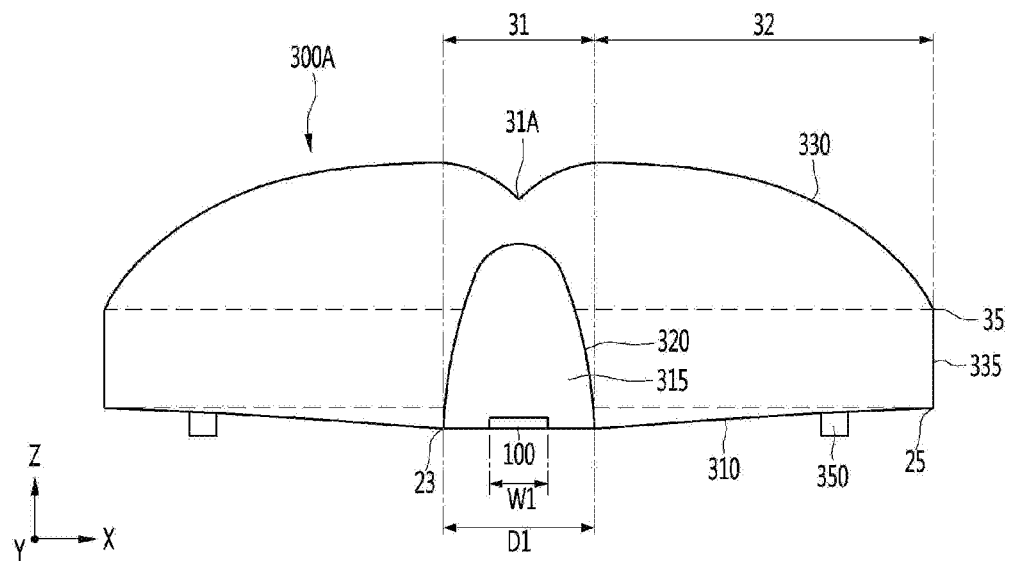
FIG. 21 is a modification of the optical lens in the lighting module of FIG. 4.

FIG. 21 is another example of the optical lens of FIG. 2. Referring to FIG. 21, the first exit surface 330 of the optical lens 300A may include a concave region 31A of the center region 31. Since the center region 31 is concave, the light incident in the direction of the center region 31 may be reflected laterally by the entire reflection surface of the concave region 31A. An example of the position of the protrusion portion 350 of the optical lens 300A and the example of the absorbing layer will be described with reference to the above description of the embodiment.

Figure 22:
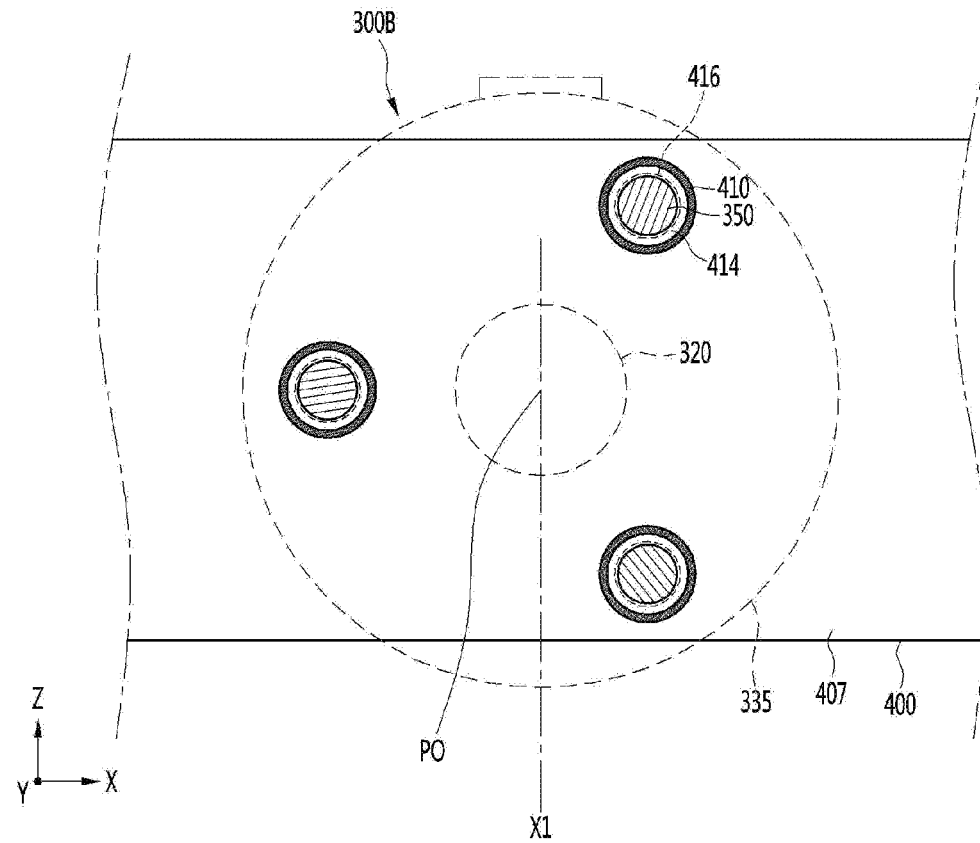
FIG. 22 is an example in which the number of protrusions of the optical lens is modified in the lighting module of FIG. 6.

FIG. 22 shows an example in which the number of protrusion portions 350 of the optical lens according to the embodiment is modified. As shown in FIG. 22, the number of the protrusion portions 350 may be three, and the absorbing layer 410 may be disposed around the protrusion portions 350. The protrusion portions 350 may be disposed at an equal angle with respect to the center P0 of the lens, or may be spaced from 100 degrees to 140 degrees. The protrusion portion 350 and the absorbing layer 410 are disposed along the recess portion and the absorbing layer 410 may absorb light that affects the central brightness around the protrusion portion 350.

FIGS. 23 and 24 are lighting modules according to an embodiment. As shown in FIGS. 23 and 24, the lighting module 301 is an example in which a plurality of optical lenses 300 are arranged on the circuit board 400 with a predetermined gap G1 in the X-axis direction. The gap G1 between the optical lenses 300 on the lighting module 301 may be reduced an optical interference between adjacent optical lens by the first and second exit surfaces 330 and 335 of the optical lens as shown in FIG. 2 and may be reduced the number of the optical lens 300 placed. As shown in FIG. 24, the optical member 175 may be disposed on the lighting module 301. The optical member 175 may include a diffusion plate. The optical member 175 may be spaced apart from the circuit board 400 by a predetermined height H1. The height H1 may be provided in an uniform light distribution by the diffused light of the optical lens 300 in the range of 20 mm or less, for example, 13 mm to 20 mm, and may be reduced a thickness of light unit having the lighting module 301. In this case, even if the distance H1 between the circuit board 400 and the optical member 175 becomes narrow, the luminance distribution of the light emitted onto the optical lens 300 may be controlled.

Figure 25:
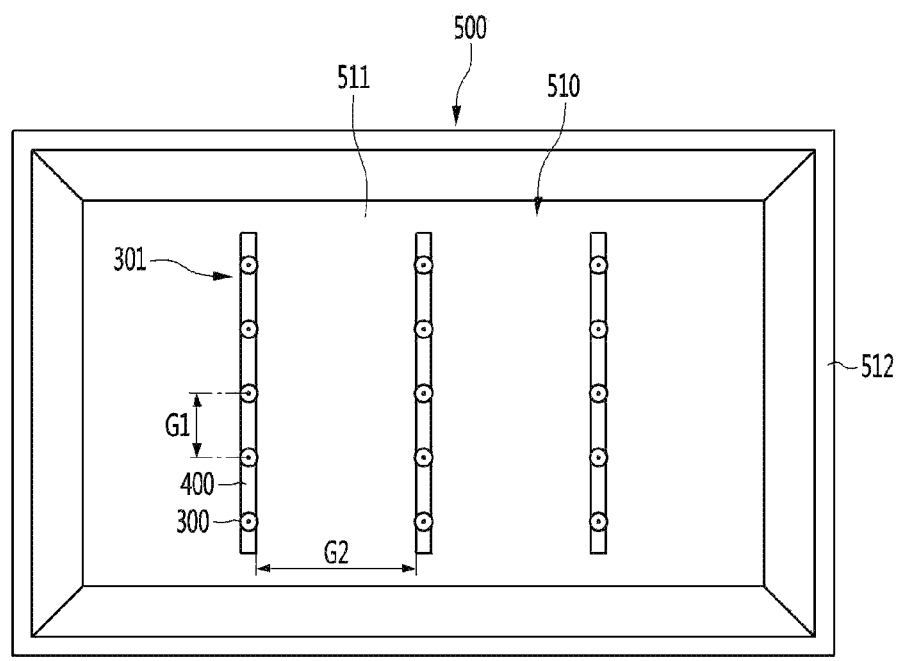
FIG. 25 is a plan view showing a light unit having a lighting module according to an embodiment of the invention.

FIG. 25 is a plan view of a light unit having a lighting module according to an embodiment. Referring to FIG. 25, the light unit 500 includes a bottom cover 512, a plurality of circuit boards 400 and a light emitting device 100 as a lighting module 301 in the bottom cover 512, and an optical lens 300 disposed on the circuit boards 400. The circuit board 400 may be arranged in the bottom cover 512. The gap G2 between the adjacent circuit boards 400 may be spaced apart by employing the optical lens 300 and the lighting module 301 having the same according to the embodiment. The bottom cover 512 may include a metal or a thermally conductive resin material for heat dissipation. The bottom cover 512 may include a receiving portion 510, the lighting module 301 may be disposed on the bottom 511 of the receiving portion 510, and a side cover may include on the periphery of the receiving portion 510.

Figure 26:
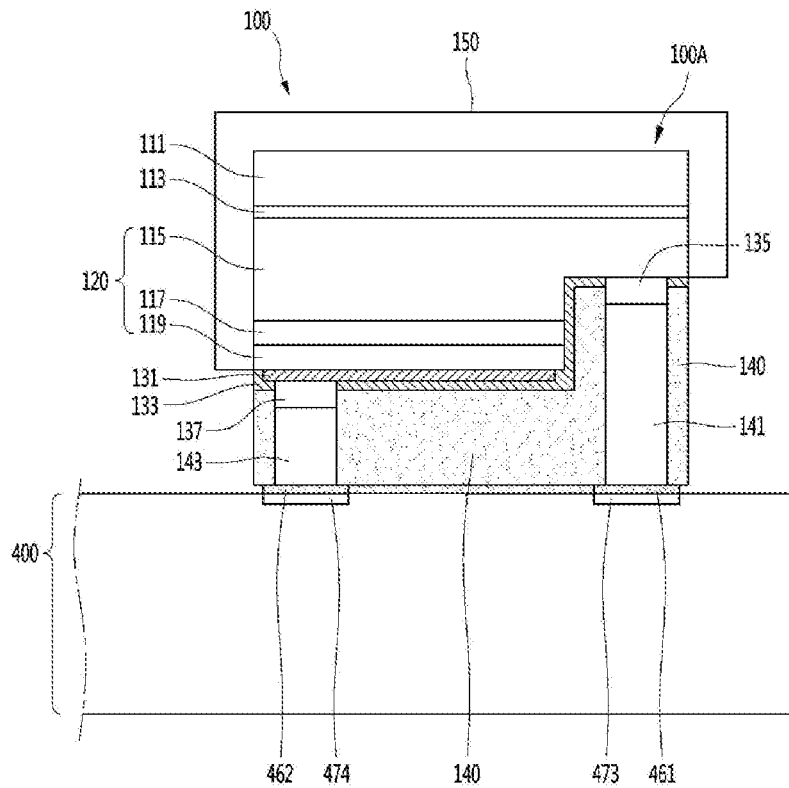
FIG. 26 is a first example showing a detailed configuration of a light emitting device arranged on a circuit board according to an embodiment of the invention.

FIG. 26 is a view showing a first example of the light emitting device according to the embodiment. The light emitting device and the circuit board will be described with reference to FIG. 19.

Referring to FIGS. 26 and 19, the light emitting device 100 includes a light emitting chip 100A. The light emitting device 100 may include a light emitting chip 100A and a phosphor layer 150 disposed on the light emitting chip 100A. The phosphor layer 150 includes at least one or more of blue, green, yellow, and red phosphors, and may be a single layer or a multi-layer structure. The phosphor layer 150A includes a phosphor added to in a light transmitting resin material. The light transmitting resin material may include a material such as silicon or epoxy, and the phosphor may be selectively formed from YAG, TAG, Silicate, Nitride, and Oxy-nitride materials.

The phosphor layer 150 may be disposed on a top surface of the light emitting chip 100A or on the top surface and side surfaces of the light emitting chip 100A. The phosphor layer 150 may be disposed on a surface of the light emitting chip 100A where the light is emitted to change the wavelength of the light. As another example, the phosphor layer 150 may include a film type. Since the film type phosphor layer has a uniform thickness, the color distribution due to the wavelength conversion may be uniform.

In terms of the light emitting chip 100A, the light emitting chip 100A includes a substrate 111, a first semiconductor layer 113, a light emitting structure 120, an electrode layer 131, an insulating layer 133, a first electrode 135, a second electrode 137, a first connection electrode 141, a second connection electrode 143, and a support layer 140.

The substrate 111 may use a light transmittable, insulating, or conductive substrate. For example, the substrate 111 may use at least one of sapphire ($Al_2O_3$), SiC, S1, GaAs, GaN, ZnO, GaP, InP, Ge, and $Ga_2O_3$. A plurality of convex portions (not shown) may be formed on at least one or all of a top surface and a bottom surface of the substrate 111 to improve light extraction efficiency. A side cross-sectional shape of each convex portion may include at least one of a hemispherical shape, a half-oval shape, or a polygonal shape. Here, the substrate 111 may be removed in the light emitting chip 100A, and in this case, the first semiconductor layer 113 or a first conductive semiconductor layer 115 may be disposed as a top layer of the light emitting chip 100A.

A first semiconductor layer 113 and a light emitting structure 120 may be formed under the substrate 111. The first semiconductor layer 113 and the light emitting structure 120 may be formed using compound semiconductors of group II to V elements, For example, a semiconductor layer using a compound semiconductor of group III-V elements that include at least one of GaN, InN, AlN, InGaN, AlGaN, InAlGaN, AlInN, AlGaAs, GaP, GaAs, GaAsP, AlGaInP and GaP. The light emitting structure 120 may emit a predetermined peak wavelength within the wavelength range of the ultraviolet band to the visible light band.

The light emitting structure 120 includes a first conductive semiconductor layer 115, a second conductive semiconductor layer 119, and an active layer 117 between the first conductive semiconductor layer 115 and the second conductive semiconductor layer 119. Another semiconductor layer may be further disposed on at least one of above or below each of the layers 115, 117, and 119, but embodiments are not limited thereto.

The first conductive semiconductor layer 115 may be disposed under the first semiconductor layer 113 and may be formed of a semiconductor, for example, an n-type semiconductor layer doped with a first conductive dopant. The first conductive semiconductor layer 115 includes a composition formula of $In_xAl_yGa_{1-x-y}N$ ($0 \le x \le 1$, $0 \le y \le 1$, $0 \le x+y \le 1$). The first conductive semiconductor layer 115 may be a compound semiconductor of Group III-V elements such as GaN, AlN, AlGaN, InGaN, InN, InAlGaN, AlInN, AlGaAs, GaP, GaAs, GaAsP. The first conductive dopant is an n-type dopant and includes dopants such as Si, Ge, Sn, Se, and Te.

The active layer 117 is disposed under the first conductive semiconductor layer 115 and selectively includes a single quantum well, a multiple quantum well (MQW), a quantum wire structure, or a quantum dot structure, and includes a period of the well layer and the barrier layer. The periods of the well layer/barrier layer include at least one among pairs of InGaN/GaN, GaN/AlGaN, AlGaN/AlGaN, InGaN/AlGaN, InGaN/InGaN, AlGaAs/GaA, InGaAs/GaAs, InGaP/GaP, AlInGaP/InGaP, and InP/GaAs.

The second conductive semiconductor layer 119 is disposed under the active layer 117. The second conductive semiconductor layer 119 may be formed of a semiconductor doped with a second conductive dopant, for example, includes a composition formula of $In_xAl_yGa_{1-x-y}N$ ($0 \le x \le 1$, $0 \le y \le 1$, $0 \le x+y \le 1$). The second conductive semiconductor layer 119 may include at least one of compound semiconductors such as GaN, InN, AlN, InGaN, AlGaN, InAlGaN, AlInN, AlGaAs, GaP, GaAs, GaAsP and AlGaInP. The second conductive semiconductor layer 119 may be a p-type semiconductor layer, and the second conductive dopant may include Mg, Zn, Ca, Sr, and Ba as p-type dopants.

As another example of the light emitting structure 120, the first conductive semiconductor layer 115 may be a p-type semiconductor layer, and the second conductive semiconductor layer 119 may be an n-type semiconductor layer. A third conductivity type semiconductor layer having a polarity opposite to the second conductivity type may be formed on the second conductive semiconductor layer 119. Also, the light emitting structure 120 may have any one of an n-p junction structure, a p-n junction structure, an n-p-n junction structure, and a p-n-p junction structure.

An electrode layer 131 is formed under the second conductive semiconductor layer 119. The electrode layer 131 may include a reflective layer. The electrode layer 131 may include an ohmic contact layer contacting the second conductive semiconductor layer 119 of the light emitting structure 120. The reflective layer may be selected from a material having a reflectance of 70% or more, for example, a metal of Al, Ag, Ru, Pd, Rh, Pt or Ir, and an alloy of two or more of the above metals. The metal of the reflective layer may contact the second conductive semiconductor layer 119. The ohmic contact layer may be selected from a light-transmitting material, a metal or a non-metal material.

The electrode layer 131 may include a laminate structure of a transparent electrode layer/a reflective layer. The transparent electrode layer may be formed of indium tin oxide (ITO), indium zinc oxide (IZO), indium zinc tin oxide (IZTO) zinc oxide (IGTO), indium gallium tin oxide (IGTO), aluminum zinc oxide (AZO), antimony tin oxide (ATO), gallium zinc oxide (GZO), Ag, Ni, Al, Rh, Pd, Ir, Ru, Mg, Zn, Pt, Au, Hf, and combinations thereof. A reflective layer of a metal material may be disposed under the transparent electrode layer and may be formed of a material selected from Ag, Ni, Al, Rh, Pd, Ir, Ru, Mg, Zn, Pt, Au, Hf and materials formed of selective combinations of the above. As another example of the reflective layer, a DBR (distributed Bragg reflection) structure in which two layers having different refractive indices are alternately arranged may be formed.

A light extracting structure such as a roughness may be formed on the surface of at least one of the second conductive semiconductor layer 119 and the electrode layer 131. Such a light extracting structure may change the critical angle of incident light and the light extraction efficiency may be improved.

The insulating layer 133 is disposed under the electrode layer 131. The insulating layer 133 may be disposed on the lower surface of the second conductive semiconductor layer 119 and the side surfaces of the second conductive semiconductor layer 119 and the active layer 117, and disposed on a partial region of the first conductive semiconductor layer 115. The insulating layer 133 is formed in the lower region of the light emitting structure 120 except for the electrode layer 131, the first electrode 135, and the second electrode 137, and protects electrically the lower portion of the light emitting structure 120. The insulating layer 133 may be a DBR (distributed Bragg reflector) structure in which first and second layers having different refractive indices are alternately arranged.

A first electrode 135 may be disposed under a portion of the first conductive semiconductor layer 115 and a second electrode 137 may be disposed under a portion of the electrode layer 131. A first connection electrode 141 is disposed under the first electrode 135 and a second connection electrode 143 is disposed under the second electrode 137. The first electrode 135 is electrically connected to the first conductive semiconductor layer 115 and the first connection electrode 141 and the second electrode 137 is electrically connected to the first electrode 135 through the electrode layer 131. The first connection electrode 141 and the second connection electrode 143 provide a lead function and a heat dissipation path for supplying power. The first connection electrode 141 and the second connection electrode 143 may include at least one of a circular shape, a polygonal shape, a circular column, and a shape such as a polygonal column. The first connection electrode 141 and the second connection electrode 143 may be formed of a metal powder material such as Ag, Al, Au, Cr, Co, Cu, Fe, Hf, In, Mo, Ni, Ti, W, and a selective alloy of these metals. The first connection electrode 141 and the second connection electrode 143 may be plated with any one metal of In, Sn, Ni, Cu, and selective alloys thereof to improve an adhesive force with the first electrode 135 and the second electrode 137.

The support layer 140 includes a thermally conductive material and is disposed around the first electrode 135, the second electrode 137, the first connection electrode 141, and the second connection electrode 143. The lower surfaces of the first and second connection electrodes 141 and 143 may be exposed on the lower surface of the support layer 140.

The supporting layer 140 is used as a layer for supporting the light emitting device 100. The supporting layer 140 is formed of an insulating material, and the insulating material is formed of a resin layer such as silicon or epoxy. As another example, the insulating material may include a paste or an insulating ink. At least one of compounds such as oxides, nitrides, fluorides, and sulfides having at least one of Al, Cr, Si, Ti, Zn, and Zr may be added to the supporting layer 140. The light emitting chip 100A is mounted on the circuit board 400 in a flip manner. The circuit board 400 may include the layers disclosed above.

The first and second lead electrodes 473 and 474 are electrically connected to the first and second connection electrodes 141 and 143 of the light emitting chip 100A. Conductive adhesives 461 and 462 may be disposed between the first and second lead electrodes 473 and 474 and the connection electrodes 141 and 143 of the light emitting chip 100A. The conductive adhesives 461 and 462 may include a metal material such as a solder material. The first lead electrode 473 and the second lead electrode 474 serve as a circuit pattern to supply power.

A second example of the light emitting device of the lighting module will be described with reference to FIG. 27.

Figure 27:
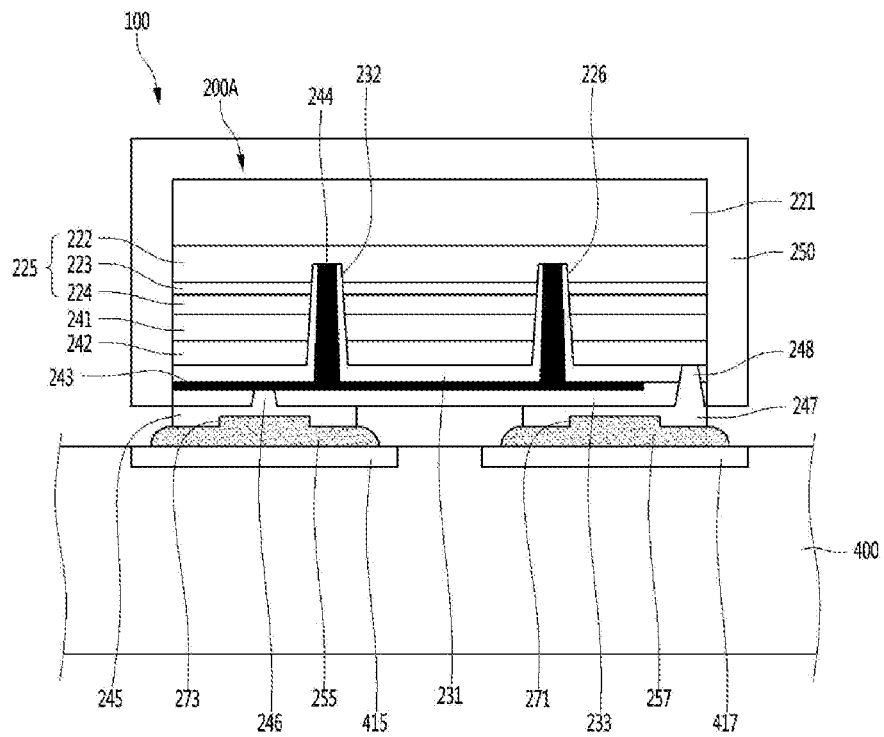
FIG. 27 is a second example of a light emitting device disposed on a circuit board according to an embodiment of the invention.

Referring to FIG. 27, the light emitting device 100 includes a light emitting chip 200A connected to a circuit board 400. The light emitting device 100 may include a phosphor layer 250 disposed on the surface of the light emitting chip 200A. The phosphor layer 250 converts the wavelength of incident light. As shown in FIG. 4, an optical lens (300 of FIG. 4) is disposed on the light emitting device 100 to control beam spread characteristics of light emitted from the light emitting chip 200A.

The light emitting chip 200A includes a light emitting structure 225, and a plurality of pads 245 and 247. The light emitting structure 225 may be formed of a compound semiconductor layer of a group II to VI element, for example, a compound semiconductor layer of a group III-V element, or a compound semiconductor layer of a group II-VI element. The plurality of pads 245 and 247 are selectively connected to the semiconductor layer of the light emitting structure 225 to supply power.

The light emitting structure 225 includes a first conductive semiconductor layer 222, an active layer 223, and a second conductive semiconductor layer 224. The light emitting chip 200A may include a substrate 221. The substrate 221 is disposed on the light emitting structure 225. The substrate 221 may be, for example, a light-transmitting substrate, an insulating substrate, or a conductive substrate. This structure will be described with reference to the description of the light emitting structure and the substrate in FIG. 4.

The light emitting chip 200A has pads 245 and 247 disposed thereunder and the pads 245 and 247 include first and second pads 245 and 247. The first and second pads 245 and 247 are spaced apart from each other below the light emitting chip 200A. The first pad 245 is electrically connected to the first conductive semiconductor layer 222 and the second pad 247 is electrically connected to the second conductive semiconductor layer 224. The first and second pads 245 and 247 may have a polygonal or circular bottom shape or may be formed to correspond to the shapes of the first and second lead electrodes 415 and 417 of the circuit board 400. The bottom surface area of each of the first and second pads 245 and 247 may be, for example, a size corresponding to the top surface size of each of the first and second lead electrodes 415 and 417.

The light emitting chip 200A may include at least one of a buffer layer (not shown) and an undoped semiconductor layer (not shown) between the substrate 221 and the light emitting structure 225. The buffer layer is a layer for relaxing the difference in lattice constant between the substrate 221 and the semiconductor layer, and may be selectively formed from Group II to VI compound semiconductors. An undoped Group III-V compound semiconductor layer may be further formed under the buffer layer, but the invention is not limited thereto. The substrate 221 may be removed. When the substrate 221 is removed, the phosphor layer 250 may contact the top surface of the first conductive semiconductor layer 222 or the top surface of another semiconductor layer.

The light emitting chip 200A includes first and second electrode layers 241 and 242, a third electrode layer 243, and insulating layers 231 and 233. Each of the first and second electrode layers 241 and 242 may be formed as a single layer or a multilayer, and may function as a current diffusion layer. The first and second electrode layers 241 and 242 include a first electrode layer 241 disposed under the light emitting structure 225; and a second electrode layer 242 disposed under the first electrode layer 241. The first electrode layer 241 diffuses a current, and the second electrode layer 241 reflects incident light.

The first and second electrode layers 241 and 242 may be formed of different materials. The first electrode layer 241 may be formed of a light-transmitting material, for example, a metal oxide or a metal nitride. The first electrode layer may include at least one of indium tin oxide (ITO), indium tin oxide (ITO), indium zinc oxide (IZO), indium zinc oxide (IZO) indium gallium zinc oxide, indium gallium tin oxide (IGTO), aluminum zinc oxide (AZO), antimony tin oxide (ATO), and gallium zinc oxide (GZO). The second electrode layer 242 may contact the lower surface of the first electrode layer 241 and function as a reflective electrode layer. The second electrode layer 242 includes a metal such as Ag, Au, or Al. The second electrode layer 242 may partially contact the lower surface of the light emitting structure 225 when the first electrode layer 241 is partially removed.

As another example, the structures of the first and second electrode layers 241 and 242 may be stacked in an omnidirectional reflector layer (ODR) structure. The omnidirectional reflection structure may have a stacked structure of a first electrode layer 241 having a low refractive index and a second electrode layer 242 made of a highly reflective metal material in contact with the first electrode layer 241. The electrode layers 241 and 242 may have a laminated structure of, for example, ITO/Ag. The total reflection angle at the interface between the first electrode layer 241 and the second electrode layer 242 may be improved.

The third electrode layer 243 is disposed under the second electrode layer 242 and is electrically insulated from the first and second electrode layers 241 and 242. The third electrode layer 243 may be formed of a metal such as titanium (Ti), copper (Cu), nickel (Ni), gold (Au), chromium (Cr), tantalum (Ta), platinum (Pt), tin (Sn), silver (Ag), and phosphorus (P). A first pad 245 and a second pad 247 are disposed under the third electrode layer 243. The insulating layers 231 and 233 prevent unnecessary contact between the first and second electrode layers 241 and 242, the third electrode layer 243, the first and second pads 245 and 247, and the light emitting structure 225. The insulating layers 231 and 233 include first and second insulating layers 231 and 233. The first insulating layer 231 is disposed between the third electrode layer 243 and the second electrode layer 242. The second insulating layer 233 is disposed between the third electrode layer 243 and the second half pads 245 and 247. The first and second pads 245 and 247 may include the same material as the first and second lead electrodes 415 and 417.

The third electrode layer 243 is connected to the first conductive semiconductor layer 222. A connection portion 244 of the third electrode layer 243 protrudes in a via structure through the first and second electrode layers 241 and 242 and the lower part of the light emitting structure 225 and contacts the first conductive semiconductor layer 222. The connection portions 244 may be disposed in a plurality. A portion 232 of the first insulating layer 231 extends around the connecting portion 244 of the third electrode layer 243 and blocks unnecessary contact between the third electrode layer 243, the first and second electrode layers 241 and 242, and the second conductive semiconductor layer 224 and the active layer 223. An insulating layer may be disposed on the side surface of the light emitting structure 225 to protect the side surface of the light emitting structure 225, and the invention is not limited thereto.

The second pad 247 is disposed below the second insulating layer 233, and comes in contact or is connected to at least one of the first and second electrode layers 241 and 242 through an open region of the second insulating layer 233. The first pad 245 is disposed below the second insulating layer 233 and connected to the third electrode layer 243 through the open region of the second insulating layer 233. Consequently, a protrusion 248 of the first pad 247 is electrically connected to the second conductive semiconductor layer 224 through the first and second electrode layers 241 and 242, and a protrusion 246 of the second pad 248 is electrically connected to the first conductive semiconductor layer 222 through the third electrode layer 243.

The first and second pads 245 and 247 are spaced apart from each other at the lower portion of the light emitting chip 200A, and face the first and second lead electrodes 415 and 417 of the circuit board 400. The first and second pads 245 and 247 may include recesses 271 and 273 of polygonal shapes, and the recesses 271 and 273 are convexly formed toward the light emitting structure 225. The recesses 271 and 273 may be formed with depths which are the same or smaller than the thicknesses of the first and second pads 245 and 247, and the depths of the recesses 271 and 273 may increase surface areas of the first and second pads 245 and 247.

Bonding members 255 and 257 are respectively disposed at a region between the first pad 245 and the first lead electrode 415 and a region between the second pad 247 and the second lead electrode 417. The bonding members 255 and 257 may include an electrical conductive material, and have a portion disposed at the recesses 271 and 273. Since the bonding members 255 and 257 are disposed at the recesses 271 and 273, contact areas between the bonding members 255 and 257 and the first and second pads 245 and 247 may increase. Consequently, since the first and second pads 245 and 247 and the first and second lead electrodes 415 and 417 are bonded, electrical reliability and radiation efficiency of the light emitting chip 200A may be improved.

The bonding members 255 and 257 may include a solder paste material. The solder paste material includes at least one of Au, Sn, Pb, Cu, Bi, In, and Ag. Since the bonding members 255 and 257 directly conduct heat to the circuit board 400, the thermal conduction efficiency may be improved compared to a structure using a package. Also, since the bonding members 255 and 257 are materials having small differences in thermal expansion coefficients with the first and second pads 245 and 247, the thermal conduction efficiency may be improved. As another example, the bonding members 255 and 257 may include a conductive film, and the conductive film includes one or more conductive particles within an insulating film. The conductive particles may include at least one of a metal, a metal alloy, or carbon, for example. The conductive particles may include at least one of Ni, Ag, Au, Al, Cr, Cu, and C. The conductive film may include an anisotropic conductive film or an anisotropic conductive adhesive agent.

An adhesive member, e.g. a thermally conductive film, may be included between the light emitting chip 200A and the circuit board 400. The thermally conductive film may use a polyester resin such as polyethylene terephthalate, polybutylene terephthalate, polyethylene naphtha late, and polybutylene naphtha late, a polyimide resin, an acrylic resin, a styrene-based resin such as polystyrene resin and acrylonitrile-styrene resin, a polycarbonate resin, a polylactic resin, and a polyurethane resin. Also, the thermally conductive film may include at least one of a polyolefin resin such as polyethylene, polypropylene, and ethylene-propylene copolymers, a vinyl resin such as polyvinyl chloride resin and polyvinylidene chloride resin, a polyamide resin, a sulfonyl-based resin, a polyether-ether ketone based resin, an acrylate-based resin, or blends of the above resins.

The light emitting chip 200A may emit light through a surface of the circuit board 400 and side surfaces and an upper surface of the light emitting structure 225 to improve the light extraction efficiency. The light emitting chip 200A may be directly bonded on the circuit board 400, thereby simplifying the process. Also, as the radiation of the light emitting chip 200A is improved, the light emitting chip 200A may be usefully used in the lighting field.

Such a light unit may be applied to a display device such as a portable terminal, a monitor of a notebook computer, a monitor of a laptop computer, a TV, a three-dimensional display, various illumination lamps, a traffic light, a vehicle headlight, a tail lamp or an electric signboard.

The features, structures, effects and the like described in the embodiments are included in at least one embodiment of the invention and are not necessarily limited to only one embodiment. Furthermore, the features, structures, effects and the like illustrated in the embodiments may be combined and modified by other persons skilled in the art to which the embodiments belong. Therefore, it should be understood that the invention is not limited to these combinations and modifications.

While the invention has been particularly shown and described with reference to exemplary embodiments thereof, it is clearly understood that the same is by way of illustration and example only and is not to be taken by way of illustration, It may be seen that various modifications and applications are possible. For example, each component specifically shown in the embodiment may be modified and implemented. It is to be understood that all changes and modifications that come within the meaning and range of equivalency of the claims are therefore intended to be embraced therein.

INDUSTRIAL APPLICABILITY

Embodiments may improve the reliability of a lighting module having an optical lens.

Embodiments may be applied to a lighting device such as a display, various lighting lamps, a traffic light, a vehicle headlight, and an electric signboard using a lighting module having an optical lens.

The invention claimed is:

1. A lighting module comprising:
a circuit board having a plurality of first recesses;
an optical lens disposed on the circuit board;
a light emitting device disposed between the optical lens and the circuit board; and
an absorbing layer disposed on the circuit board,
wherein the optical lens includes: a bottom surface, a first exit surface having a convex curved surface, a second recess having an incident surface concave from the bottom surface toward the first exit surface; and a plurality of protrusion portions protruding from the bottom surface toward the circuit board,
wherein the second recess is disposed on the light emitting device,
wherein a portion of each of the plurality of protrusions is disposed in each of the first recesses,
wherein the absorbing layer includes a plurality of absorbing portions spaced apart from each other,
wherein the absorbing layer surrounds each of the plurality of protrusion portions on the circuit board,
wherein each of the absorbing portions surrounding each of the protrusion portions is disposed in a region of 2.5 times or less than a radius of each of the protrusion portions from a center of each of the protrusion portions,
wherein different absorbing portions surrounding each of the protrusion portions are separated from each other, and
wherein the center of each of the protrusion portions is disposed in a range of 0.3 to 0.95 times a radius of the bottom surface from a bottom center of the second recess.

2. The lighting module of claim 1,
further comprising an adhesive member between each of the first recesses and each of the protrusion portions,
wherein the absorbing portions surrounding each of the protrusion portions have the same distance from the center of each of the protrusion portions.

3. The lighting module of claim 1, wherein an outer diameter of each of the absorbing portions is disposed in a range of 1.3 to 2.5 times the radius of each of the protrusion portions from the center of each of the protrusion portions.

4. The lighting module of claim 1, wherein the center of each of the protrusion portions is disposed in a range of 45 to 85 degrees at an angle with a bottom center of the bottom surface based on the first exit surface.

5. The lighting module of claim 1, wherein a top surface area of each of the absorbing portions surrounding each of the protrusion portions is smaller than a bottom area of each of the protrusion portions, or is 2.6 times or less than the bottom area of each of the protrusion portions.

6. The lighting module of claim 1, wherein an area of a top surface of the absorbing layer facing the bottom surface of the optical lens is less than or equal to 11% of an area of the bottom surface of the optical lens.

7. The lighting module of claim 2, wherein each of the absorbing portions is disposed in a ring shape around each of the plurality of protrusions, and
wherein the adhesive member is disposed between each of the absorbing portions and each of the protrusion portions.

8. The lighting module of claim 7, wherein at least one of the absorbing portions includes a plurality of absorbing regions along a circumference of each of the protrusion portions and a space between the plurality of absorbing regions.

9. The lighting module of claim 1, wherein each of the protrusion portions and the absorbing layer are disposed on a region of a brightness portion where light emitted from the light emitting device is reflected and transmitted by the first exit surface, and
wherein the region of a brightness portion includes a region where a luminous intensity of light traveling to the bottom surface of the optical lens is 80% or more of a peak value among the bottom surface of the optical lens.

10. The lighting module of claim 1, wherein the optical lens is disposed in plural in a first direction on the circuit board,
wherein a length of the optical lens in a second direction is longer than a length of the circuit board in the second direction, and
wherein the length of the optical lens in the first and second directions is greater than a thickness of the optical lens.

11. A lighting module comprising:
a circuit board having a plurality of first recesses;
an optical lens disposed on the circuit board;
a light emitting device disposed between the optical lens and the circuit board; and
an absorbing layer disposed on the circuit board,
wherein the optical lens includes a bottom surface; and a plurality of protrusion portions protruding from the bottom surface toward the circuit board,
wherein a lower portion of each of the plurality of protrusion portions is disposed in each of the first recesses,
wherein the absorbing layer includes a plurality of absorbing portions spaced from each other,
wherein each of the absorbing portions surrounds each of the plurality of protrusion portions on the circuit board,
wherein each of the absorbing portions is in non-contact with the plurality of protrusion portions,
wherein each of the absorbing portions surrounding each of the protrusion portions is disposed in a region of 2.5 times or less than a radius of each of the protrusion portions from a center of the protrusion portions, and
wherein the center of the protrusion portions is disposed in a range of 0.3 to 0.95 times a radius of the bottom surface of the optical lens from a bottom center of the second recess.

12. The lighting module of claim 11, further comprising a plurality of adhesive members disposed between each of the first recesses and each of the protrusion portions, respectively,
wherein the plurality of adhesive members are separated from each other.

13. The lighting module of claim 11, wherein an outer diameter of each of the absorbing portions is in a range of 1.3 to 2.5 times the radius of each of the protrusion portions from the center of each of the protrusion portions, and
wherein the absorbing portions surrounding each of the protrusion portions have the same distance from the center of each of the protrusion portions.

14. The lighting module of claim 11, wherein the optical lens comprises: a second recess having a concave incident surface from the bottom surface; and a first exit surface for emitting light incident through the incident surface, and
wherein the center of each of the protrusion portions is disposed in a range of 45 degrees to 85 degrees at an angle with a bottom center of the bottom surface of the optical lens based on the first exit surface.

15. The lighting module of claim 11, wherein an area of a top surface of each of the absorbing portions surrounding each of the protrusion portions is smaller than an area of a bottom surface of each of the protrusion portions or 2.6 times or is less than a bottom surface area of each of the protrusion portions.

16. The lighting module of claim 11, wherein an area of a top surface of the absorbing layer facing the bottom surface of the optical lens is less than or equal to 11% of an area of the bottom surface of the optical lens.

17. The lighting module of claim 12, wherein a number of the absorbing portions and a number of the protrusion portions disposed under the optical lens are the same, and
wherein each of the absorbing portions has a ring shape.

18. The lighting module of claim 17, wherein each of the absorbing portions comprises an absorbing region along a circumference of each of the protrusion portions and a space in which no absorbing region is formed.

19. The lighting module of claim 14, wherein each of the protrusion portions and the absorbing layer are disposed on a region of a brightness portion where light emitted from the light emitting device is reflected and transmitted by the first exit surface, and
wherein the region of the brightness portion includes a region where a luminous intensity of light traveling to the bottom surface of the optical lens is 80% or more of a peak value of the bottom surface of the optical lens.

20. The lighting module of claim 11, wherein the optical lens are is arranged in plural in a first direction on the circuit board,
wherein a length of the optical lens in a second direction is longer than a length of the circuit board in the second direction, and
wherein a length of the optical lens in the first and second directions is greater than a thickness of the optical lens.

* * * * *